(12) United States Patent
Li et al.

(10) Patent No.: US 12,517,407 B2
(45) Date of Patent: Jan. 6, 2026

(54) DISPLAY PANEL AND DISPLAY APPARATUS

(71) Applicant: BOE Technology Group Co., Ltd., Beijing (CN)

(72) Inventors: Feifei Li, Beijing (CN); Zhao Cui, Beijing (CN); Zhengliang Li, Beijing (CN); Hehe Hu, Beijing (CN); Kun Zhao, Beijing (CN); Jie Huang, Beijing (CN); Nianqi Yao, Beijing (CN); Jiayu He, Beijing (CN); Xu Fu, Beijing (CN); Feng Qu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/699,662

(22) PCT Filed: Jul. 12, 2023

(86) PCT No.: PCT/CN2023/106859
§ 371 (c)(1),
(2) Date: Apr. 9, 2024

(87) PCT Pub. No.: WO2025/010634
PCT Pub. Date: Jan. 16, 2025

(65) Prior Publication Data
US 2025/0237917 A1 Jul. 24, 2025

(51) Int. Cl.
G02F 1/1368 (2006.01)
G02F 1/1335 (2006.01)
G02F 1/1343 (2006.01)

(52) U.S. Cl.
CPC ...... G02F 1/1368 (2013.01); G02F 1/133512 (2013.01); G02F 1/133514 (2013.01); G02F 1/134309 (2013.01)

(58) Field of Classification Search
CPC ............ G02F 1/133512; G02F 1/1368; G02F 1/133514; G02F 1/134309; G02F 1/1313; H01Q 1/243; H01Q 3/44
See application file for complete search history.

(56) References Cited

U.S. PATENT DOCUMENTS 6,885,345 B2 * 4/2005 Jackson ............... H01Q 3/40
343/876
2004/0095288 A1 5/2004 Jackson
(Continued)

FOREIGN PATENT DOCUMENTS

CN 101308266 A 11/2008
CN 105589269 A 5/2016
(Continued)

OTHER PUBLICATIONS

International Search Report & Written Opinion mailed Apr. 1, 2024, regarding PCT/CN2023/106859.

Primary Examiner — Jessica M Merlin
(74) Attorney, Agent, or Firm — Intellectual Valley Law, P.C.

(57) ABSTRACT

A display panel is provided. The display panel includes a plurality of subpixels, a plurality of antenna units, a color filter and a black matrix. The color filter includes a plurality of color filter blocks. An orthographic projection of a respective color filter block of the plurality of color filter blocks on a first base substrate at least partially overlaps with an orthographic projection of a third electrode on the first base substrate, and at least partially overlaps with an orthographic projection of a fourth electrode on the first base substrate. An orthographic projection of the black matrix on the first base substrate at least partially overlaps with an orthographic projection of a first electrode on the first base (Continued)

substrate, and at least partially overlaps with an orthographic projection of a second electrode on the first base substrate.

19 Claims, 13 Drawing Sheets

(56) References Cited

U.S. PATENT DOCUMENTS

| | | | |
|---|---|---|---|
| 2012/0092577 A1* | 4/2012 | Shi | G02F 1/13338 |
| | | | 445/24 |
| 2023/0116249 A1 | 4/2023 | Wang et al. | |

FOREIGN PATENT DOCUMENTS

| | | | | | |
|---|---|---|---|---|---|
| CN | 108663854 | A | | 10/2018 | |
| CN | 110392930 | A | | 10/2019 | |
| CN | 110462843 | A | * | 11/2019 | ............... G02F 1/13 |
| CN | 110794606 | A | * | 2/2020 | ............ G02F 1/1333 |
| CN | 110797395 | A | | 2/2020 | |
| CN | 111413815 | A | | 7/2020 | |
| CN | 111427208 | A | | 7/2020 | |
| CN | 111477123 | A | | 7/2020 | |
| CN | 113424363 | A | | 9/2021 | |
| CN | 113540766 | A | | 10/2021 | |
| WO | 2021147945 | A1 | | 7/2021 | |

* cited by examiner

DISPLAY PANEL AND DISPLAY APPARATUS

CROSS-REFERENCE TO RELATED APPLICATION

This application is a national stage application under 35 U.S.C. § 371 of International Application No. PCT/CN2023/106859, filed Jul. 12, 2023, the contents of which are incorporated by reference in the entirety.

TECHNICAL FIELD

The present invention relates to display technology, more particularly, to a display panel and a display apparatus.

BACKGROUND

A liquid crystal antenna is a type of antenna that utilizes liquid crystal technology to dynamically control its properties and optimize its performance. Liquid crystals are materials that exhibit properties of both liquids and crystals, often having ordered molecular structures that can be manipulated with external stimuli such as electric fields.

SUMMARY

In one aspect, the present disclosure provides a display panel, comprising a plurality of subpixels and a plurality of antenna units; wherein a respective antenna unit of the plurality of antenna units comprises a first base substrate, a first transistor on the first base substrate, a first electrode connected to the first transistor, and a second electrode; the display panel further comprises a liquid crystal layer extending through the plurality of subpixels and the plurality of antenna units; the first electrode and the second electrode are configured to apply an electric field across a portion of the liquid crystal layer; a respective subpixel of the plurality of subpixels comprises the first base substrate, a second transistor on the first base substrate, a third electrode connected to the second transistor, and a fourth electrode; the display panel further comprises a color filter and a black matrix; the color filter comprises a plurality of color filter blocks; an orthographic projection of a respective color filter block of the plurality of color filter blocks on the first base substrate at least partially overlaps with an orthographic projection of the third electrode on the first base substrate, and at least partially overlaps with an orthographic projection of the fourth electrode on the first base substrate; and an orthographic projection of the black matrix on the first base substrate at least partially overlaps with an orthographic projection of the first electrode on the first base substrate, and at least partially overlaps with an orthographic projection of the second electrode on the first base substrate.

Optionally, the orthographic projection of the black matrix on the first base substrate substantially covers the orthographic projection of the first electrode on the first base substrate, and substantially covers the orthographic projection of the second electrode on the first base substrate.

Optionally, an orthographic projection of the color filter on the first base substrate is substantially non-overlapping with the orthographic projection of the first electrode on the first base substrate, and is substantially non-overlapping with the orthographic projection of the second electrode on the first base substrate; and the orthographic projection of the black matrix on the first base substrate is substantially non-overlapping with the orthographic projection of the third electrode on the first base substrate, and is substantially non-overlapping with the orthographic projection of the fourth electrode on the first base substrate.

Optionally, the display panel further comprises a ground plate and a radiating plate spaced apart from each other; wherein the orthographic projection of the black matrix on the first base substrate at least partially overlaps with an orthographic projection of the ground plate on the first base substrate.

Optionally, the orthographic projection of the black matrix on the first base substrate substantially covers the orthographic projection of the ground plate on the first base substrate.

Optionally, the orthographic projection of the ground plate on the first base substrate is substantially non-overlapping with the orthographic projection of the third electrode on the first base substrate, and is substantially non-overlapping with the orthographic projection of the fourth electrode on the first base substrate; and the orthographic projection of the ground plate on the first base substrate at least partially overlaps with an orthographic projection of the first electrode on the first base substrate, and at least partially overlaps with an orthographic projection of the second electrode on the first base substrate.

Optionally, an orthographic projection of the color filter on the first base substrate at least partially overlaps with an orthographic projection of the radiating plate on the first base substrate.

Optionally, the orthographic projection of the radiating plate on the first base substrate partially overlaps with a portion of the black matrix in a region where the first electrode and the second electrode are absent.

Optionally, the orthographic projection of the radiating plate on the first base substrate is substantially non-overlapping with the orthographic projection of the first electrode on the first base substrate, and is substantially non-overlapping with the orthographic projection of the second electrode on the first base substrate; and the orthographic projection of the radiating plate on the first base substrate at least partially overlaps with an orthographic projection of the third electrode on the first base substrate, and at least partially overlaps with an orthographic projection of the fourth electrode on the first base substrate.

Optionally, the orthographic projection of the black matrix on the first base substrate at least partially overlaps with an orthographic projection of the radiating plate on the first base substrate.

Optionally, the orthographic projection of the radiating plate on the first base substrate is substantially non-overlapping with the orthographic projection of the first electrode on the first base substrate, and is substantially non-overlapping with the orthographic projection of the second electrode on the first base substrate; and the orthographic projection of the radiating plate on the first base substrate is substantially non-overlapping with the orthographic projection of the third electrode on the first base substrate, and is substantially non-overlapping with the orthographic projection of the fourth electrode on the first base substrate.

Optionally, the display panel comprises a light transmissive region, and an antenna region outside of the light transmissive region; wherein the display panel comprises a transistor plate, a first conductive layer on the transistor plate, a first planarization layer on a side of the first conductive layer away from the transistor plate, a second conductive layer on a side of the first planarization layer away from the transistor plate, the liquid crystal layer on a side of the second conductive layer away from the transistor plate, a third conductive layer on a side of the liquid crystal layer away from the transistor plate, the color filter and the black matrix on a side of the third conductive layer away from the transistor plate, and a radiating plate and a ground plate on a side of the color filter and the black matrix away from the transistor plate; wherein the third electrode and the fourth electrode are configured to modulate a portion of the liquid crystal layer in the light transmissive region; and the first electrode and the second electrode are configured to modulate a portion of the liquid crystal layer in the antenna region.

Optionally, the first conductive layer comprises the fourth electrode in the light transmissive region and the first electrode in the antenna region; the fourth electrode and the first electrode are in a same layer; the second conductive layer comprises the third electrode in the light transmissive region and the second electrode in the antenna region; and the third electrode and the second electrode are in a same layer.

Optionally, the first conductive layer comprises the fourth electrode in the light transmissive region and the first electrode in the antenna region; the fourth electrode and the first electrode are in a same layer; the second conductive layer comprises the third electrode in the light transmissive region; the third conductive layer comprises the second electrode in the antenna region; and the third electrode and the second electrode are in different layers.

Optionally, the first conductive layer comprises the first electrode in the antenna region; the second conductive layer comprises the third electrode in the light transmissive region; the third conductive layer comprises the fourth electrode in the light transmissive region and the second electrode in the antenna region; the fourth electrode and the second electrode are in a same layer; and the third electrode and the first electrode are in different layers.

Optionally, the first conductive layer comprises the fourth electrode in the light transmissive region; the second conductive layer comprises the third electrode in the light transmissive region, the first electrode in the antenna region, and the second electrode in the antenna region; and the third electrode, the first electrode, and the second electrode are in a same layer.

Optionally, the first conductive layer comprises the third electrode and the fourth electrode in the light transmissive region, and the first electrode and the second electrode in the antenna region; and the first electrode, the second electrode, the third electrode, and the fourth electrode are in a same layer.

Optionally, the first conductive layer comprises the first electrode in the antenna region; the second conductive layer comprises the third electrode in the light transmissive region and the second electrode in the antenna region; the third conductive layer comprises the fourth electrode in the light transmissive region; the third electrode and the second electrode are in a same layer; and the fourth electrode and the first electrode are in different layers.

Optionally, the second conductive layer comprises the first electrode and the second electrode in the antenna region, and the third electrode in the light transmissive region; the third conductive layer comprises the fourth electrode in the light transmissive region; and the first electrode, the second electrode, and the third electrode and are in a same layer.

In another aspect, the present disclosure provides a display apparatus, comprising the display panel described herein or fabricated by a method described herein, and one or more integrated circuits connected to the display panel.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
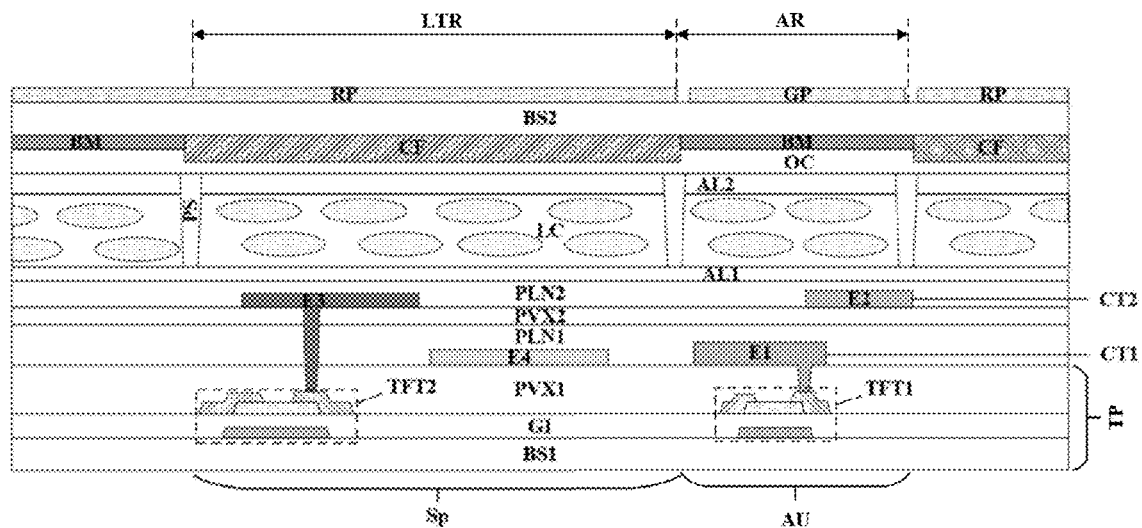
FIG. 1 is a diagram illustrating the structure of a display panel in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In related display apparatuses, antennas are mounted on the screen frame or the back plate of a display panel. These antennas in the related display apparatuses typically have mechanical or electronic structure for transmitting or receiving electromagnetic signals. The related display apparatuses, however, have low integration, lack precise control over signal transmission and reception by the antenna, and have low signal transmission efficiency. Moreover, the related display apparatuses typically adopted passive antennas that cannot achieve precise control over large-area antenna arrays.

Accordingly, the present disclosure provides, inter alia, a display panel and a display apparatus that substantially obviate one or more of the problems due to limitations and disadvantages of the related art. In one aspect, the present disclosure provides a display panel. In some embodiments, the display panel includes a plurality of subpixels and a plurality of antenna units. Optionally, a respective antenna unit of the plurality of antenna units comprises a first base substrate, a first transistor on the first base substrate, a first electrode connected to the first transistor, and a second electrode. Optionally, the display panel further comprises a liquid crystal layer extending through the plurality of subpixels and the plurality of antenna units. Optionally, the first electrode and the second electrode are configured to apply an electric field across a portion of the liquid crystal layer. Optionally, a respective subpixel of the plurality of subpixels comprises the first base substrate, a second transistor on the first base substrate, a third electrode connected to the second transistor, and a fourth electrode. Optionally, the display panel further comprises a color filter and a black matrix. Optionally, the color filter comprises a plurality of color filter blocks. Optionally, an orthographic projection of a respective color filter block of the plurality of color filter blocks on the first base substrate at least partially overlaps with an orthographic projection of the third electrode on the first base substrate, and at least partially overlaps with an orthographic projection of the fourth electrode on the first base substrate. Optionally, an orthographic projection of the black matrix on the first base substrate at least partially overlaps with an orthographic projection of the first electrode on the first base substrate, and at least partially overlaps with an orthographic projection of the second electrode on the first base substrate.

In a liquid crystal antenna, the liquid crystal material is incorporated into the structure of the antenna to provide tunability. Traditional antennas have fixed geometries and operating frequencies, but liquid crystal antennas can modify their electrical properties, such as resonance frequency, beam direction, polarization, and impedance, by applying an electric field to the liquid crystal material. The basic principle behind liquid crystal antennas involves changing the orientation or alignment of the liquid crystal molecules in response to an applied electric field. This alteration in molecular alignment affects the propagation of electromagnetic waves through the antenna structure, resulting in changes to the antenna's electrical characteristics. Liquid crystal antennas provide the ability to reconfigure or adapt the antenna's properties in real-time, enabling dynamic adjustments to changing environmental conditions or communication requirements. Liquid crystal antennas can also facilitate multifunctional antennas that can operate on multiple frequency bands or support various communication protocols.

FIG. 1 is a diagram illustrating the structure of a display panel in some embodiments according to the present disclosure. Referring to FIG. 1, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The liquid crystal layer LC are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode E3 connected to the second transistor TFT2, and a fourth electrode F4. In some embodiments, the third electrode E3 functions as a pixel electrode, and the fourth electrode E4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode F4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode F4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode F4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is an Advanced Super Dimension Switch (ADS) display panel. In some embodiments, a respective subpixel of the plurality of subpixels Sp includes a first base substrate BS1, a second transistor TFT2 on the first base substrate BS1, a first passivation layer PVX1 on a side of the second transistor TFT2 away from the first base substrate BS1, a fourth electrode E4 on a side of the first passivation layer PVX1 away from the first base substrate BS1, at least one of a first planarization layer PLN1 or a second passivation layer PVX2 on a side of the fourth electrode F4 away from the first base substrate BS1, a third electrode F3 on a side of the at least one of the first planarization layer PLN1 or the second passivation layer PVX2 away from the first base substrate BS1, a second planarization layer PLN2 on a side of the third electrode E3 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a color filter CF on a side of the second alignment layer AL2 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 on a side of the first passivation layer PVX1 away from the first base substrate BS1, at least one of a first planarization layer PLN1 or a second passivation layer PVX2 on a side of the first electrode E1 away from the first base substrate BS1, a second electrode E2 on a side of the at least one of the first planarization layer PLN1 or the second passivation layer PVX2 away from the first base substrate BS1, a second planarization layer PLN2 on a side of the second electrode E2 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a black matrix BM on a side of the second alignment layer AL2 away from the first base substrate BS1, a second base substrate BS2 on a side of the black matrix BM away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second alignment layer AL2 away from the first base substrate BS1, and on a side of the black matrix BM closer to the first base substrate BS1.

In some embodiments, the fourth electrode F4 of the respective subpixel is in a same layer as the first electrode E1 of the respective antenna unit. In some embodiments, the third electrode F3 of the respective subpixel is in a same layer as the second electrode E2 of the respective antenna unit. As used herein, the term "same layer" refers to the relationship between the layers simultaneously formed in the same step. In one example, the fourth electrode F4 and the first electrode E1 are in a same layer when they are formed as a result of one or more steps of a same patterning process performed in a material deposited in a same deposition process. In another example, the fourth electrode F4 and the first electrode E1 can be formed in a same layer by simultaneously performing the step of forming the fourth electrode F4 and the step of forming the first electrode E1. The term "same layer" does not always mean that the thickness of the layer or the height of the layer in a cross-sectional view is the same.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a color filter CF and a black matrix BM on a side of the liquid crystal layer LC away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the fourth electrode E4 in the light transmissive region LTR and the first electrode E1 in the antenna region AR. The fourth electrode E4 and the first electrode E1 are in a same layer. In some embodiments, the second conductive layer CT2 includes the third electrode E3 in the light transmissive region LTR and the second electrode E2 in the antenna region AR. The third electrode E3 and the second electrode E2 are in a same layer.

Referring to FIG. 1, in some embodiments, an orthographic projection of the first electrode E1 on the first base substrate BS1 at least partially overlaps with an orthographic projection of the second electrode E2 on the first base substrate BS1, forming a capacitor. The inventors of the present disclosure discover that the capacitor is conducive to maintaining the state of the liquid crystal molecules in the liquid crystal layer LC.

Figure 2A:
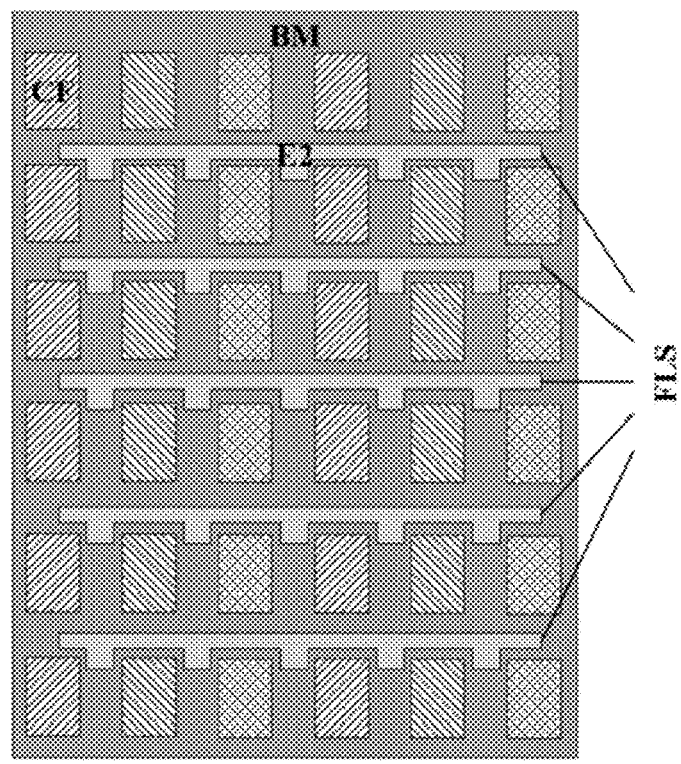
FIG. 2A is a plan view of a second electrode, a black matrix, and a color filter in a display panel in some embodiments according to the present disclosure.

FIG. 2A is a plan view of a second electrode, a black matrix, and a color filter in a display panel in some embodiments according to the present disclosure. As discussed above, the second electrode E2 in some embodiments functions as a feed line configured to transmit and/or receive electromagnetic signals. Referring to FIG. 2A, the display panel in some embodiments includes a feed line structure FLS comprising a plurality of second electrodes (e.g., the second electrode E2 is part of the plurality of second electrodes). In some embodiments, the plurality of second electrodes are arranged in a plurality of rows. A respective second electrode of the plurality of second electrodes are between two adjacent rows of color filter blocks of the color filter CF.

In the particular example depicted in FIG. 2A, an orthographic projection of the black matrix BM on a base substrate covers the orthographic projection of the feed line structure FLS on the base substrate. Optionally, the black matrix BM is a unitary structure extending throughout an inter-subpixel region of the display panel. In one example, the black matrix BM includes a plurality of horizontal rows and a plurality of vertical columns interconnected together.

Figure 2B:
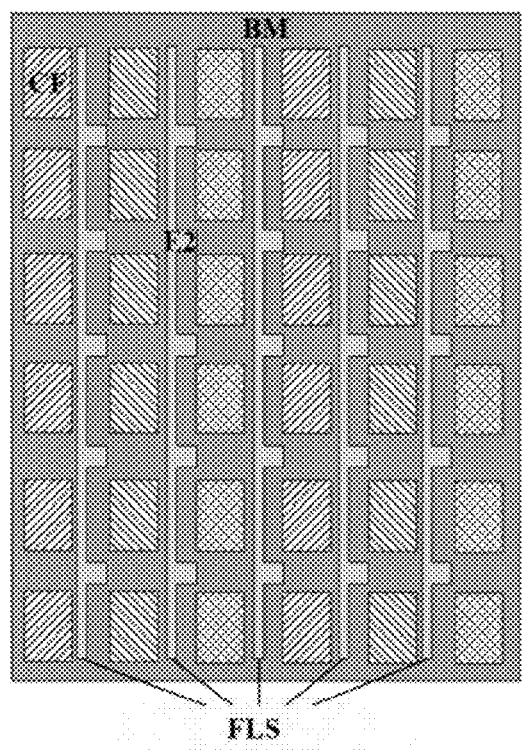
FIG. 2B is a plan view of a second electrode, a black matrix, and a color filter in a display panel in some embodiments according to the present disclosure.

FIG. 2B is a plan view of a second electrode, a black matrix, and a color filter in a display panel in some embodiments according to the present disclosure. Referring to FIG. 2B, the display panel in some embodiments includes a feed line structure FLS comprising a plurality of second electrodes (e.g., the second electrode E2 is part of the plurality of second electrodes). In some embodiments, the plurality of second electrodes are arranged in a plurality of columns. A respective second electrode of the plurality of second electrodes are between two adjacent columns of color filter blocks of the color filter CF.

In the particular example depicted in FIG. 2B, an orthographic projection of the black matrix BM on a base substrate covers the orthographic projection of the feed line structure FLS on the base substrate. Optionally, the black matrix BM is a unitary structure extending throughout an inter-subpixel region of the display panel. In one example, the black matrix BM includes a plurality of horizontal rows and a plurality of vertical columns interconnected together.

Figure 2C:
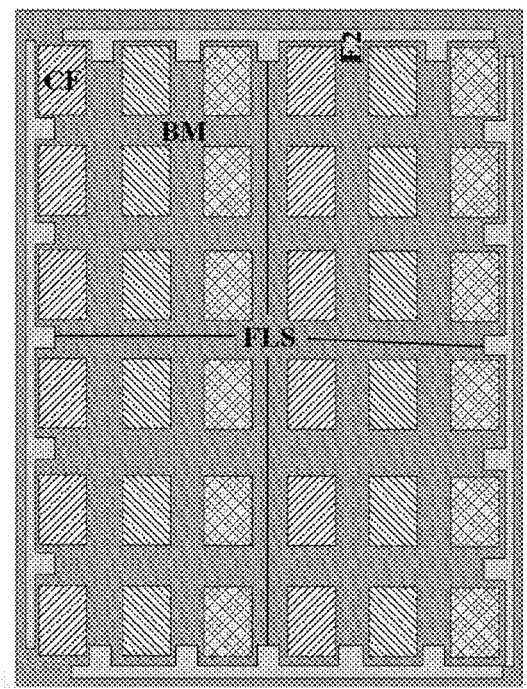
FIG. 2C is a plan view of a second electrode, a black matrix, and a color filter in a display panel in some embodiments according to the present disclosure.

FIG. 2C is a plan view of a second electrode, a black matrix, and a color filter in a display panel in some embodiments according to the present disclosure. Referring to FIG. 2C, the display panel in some embodiments includes a feed line structure FLS substantially surrounds the plurality of color filter blocks of the color filter CF, for example, surrounding at least 30% (e.g., at least 40%, at least 50%, at least 60%, at least 70%, at least 80%, at least 90%, or at least 95%) of a periphery of a region having the plurality of color filter blocks of the color filter CF. Optionally, the feed line structure FLS includes one or more rows of second electrode and one or more columns of second electrodes (e.g., the second electrode E2 is part of the feed line structure FLS).

Figure 3:
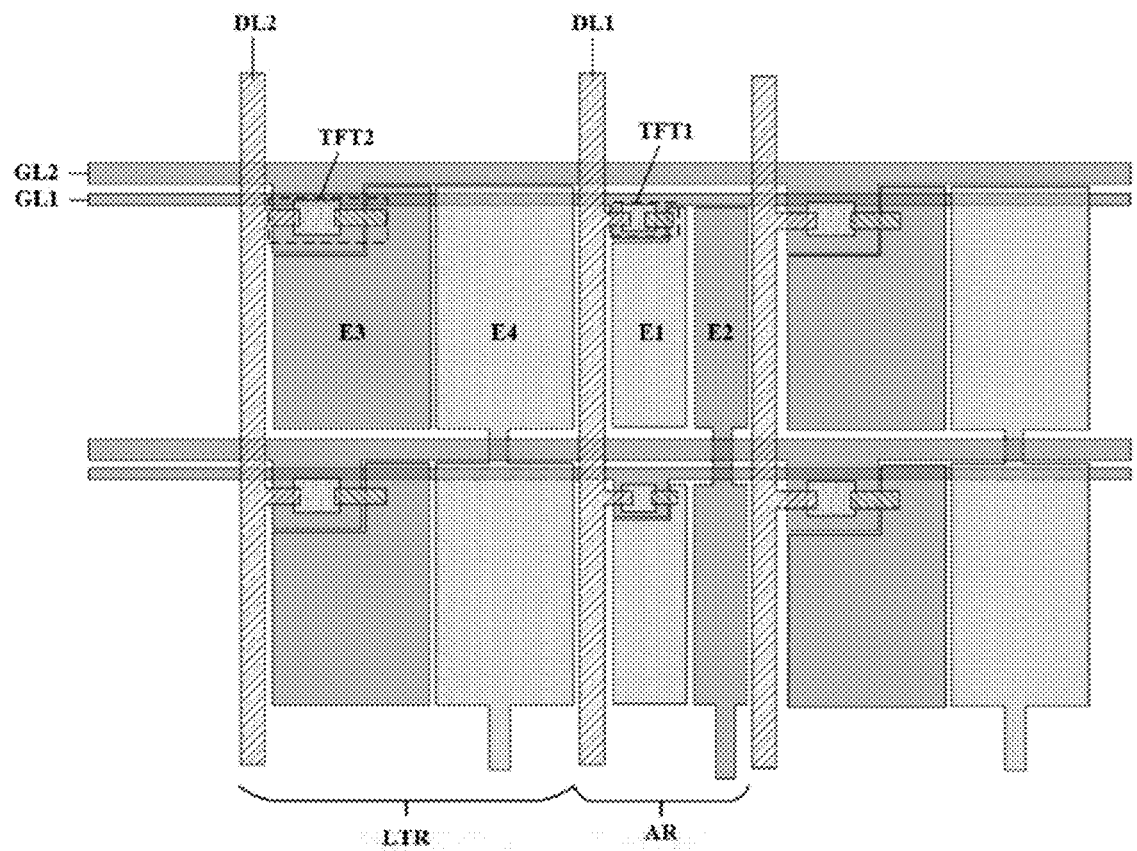
FIG. 3 is a diagram illustrating a layout of signal lines and electrodes in a display panel in some embodiments according to the present disclosure.

FIG. 3 is a diagram illustrating a layout of signal lines and electrodes in a display panel in some embodiments according to the present disclosure. Referring to FIG. 3, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 4:
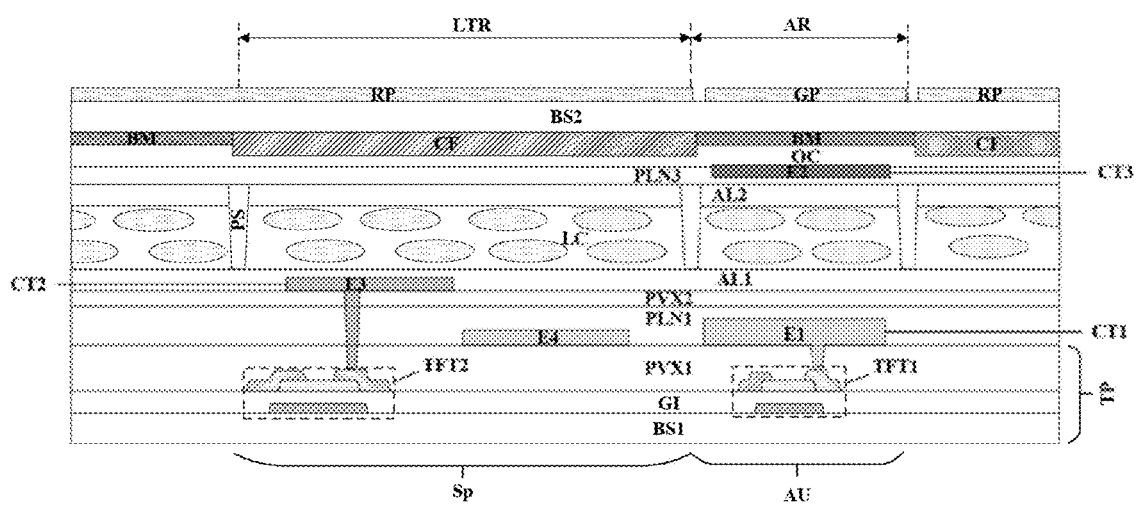
FIG. 4 is a diagram illustrating the structure of a display panel in some embodiments according to the present disclosure.

FIG. 4 is a diagram illustrating the structure of a display panel in some embodiments according to the present disclosure. Referring to FIG. 4, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode E3 connected to the second transistor TFT2, and a fourth electrode E4. In some embodiments, the third electrode E3 functions as a pixel electrode, and the fourth electrode E4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode F3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is an Advanced Super Dimension Switch (ADS) display panel. In some embodiments, a respective subpixel of the plurality of subpixels Sp includes a first base substrate BS1, a second transistor TFT2 on the first base substrate BS1, a first passivation layer PVX1 on a side of the second transistor TFT2 away from the first base substrate BS1, a fourth electrode E4 on a side of the first passivation layer PVX1 away from the first base substrate BS1, at least one of a first planarization layer PLN1 or a second passivation layer PVX2 on a side of the fourth electrode E4 away from the first base substrate BS1, a third electrode E3 on a side of the at least one of the first planarization layer PLN1 or the second passivation layer PVX2 away from the first base substrate BS1, a first alignment layer AL1 on a side of the third electrode E3 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a color filter CF on a side of the second alignment layer AL2 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 on a side of the first passivation layer PVX1 away from the first base substrate BS1, at least one of a first planarization layer PLN1 or a second passivation layer PVX2 on a side of the first electrode E1 away from the first base substrate BS1, a first alignment layer AL1 on a side of the at least one of the first planarization layer PLN1 or the second passivation layer PVX2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a second electrode E2 on a side of the second alignment layer AL2 away from the first base substrate BS1, a black matrix BM on a side of the second electrode E2 away from the first base substrate BS1, a second base substrate BS2 on a side of the black matrix BM away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second electrode E2 away from the first base substrate BS1, and on a side of the black matrix BM closer to the first base substrate BS1. Optionally, the display panel further includes a third planarization layer PLN3 on a side of the second alignment layer AL2 away from the first base substrate BS1, and on a side of the second electrode E2 closer to the first base substrate BS1.

In some embodiments, the fourth electrode E4 of the respective subpixel is in a same layer as the first electrode E1 of the respective antenna unit. In some embodiments, the third electrode E3 of the respective subpixel is in a layer different from the second electrode E2 of the respective antenna unit.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a third conductive layer CT3 on a side of the liquid crystal layer LC away from the transistor plate TP, a color filter CF and a black matrix BM on a side of the third conductive layer CT3 away from the transistor plate TP, and a radiating plate RP and a ground plate GP on a side of the color filter CF and the black matrix BM away from the transistor plate TP.

In some embodiments, the third electrode E3 and the fourth electrode F4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the fourth electrode F4 in the light transmissive region LTR and the first electrode E1 in the antenna region AR. The fourth electrode E4 and the first electrode E1 are in a same layer. In some embodiments, the second conductive layer CT2 includes the third electrode E3 in the light transmissive region LTR. In some embodiments, the third conductive layer CT3 includes the second electrode E2 in the antenna region AR. The third electrode E3 and the second electrode E2 are in different layers.

Referring to FIG. 4, in some embodiments, an orthographic projection of the first electrode E1 on the first base substrate BS1 at least partially overlaps with an orthographic projection of the second electrode E2 on the first base substrate BS1, forming a capacitor. The inventors of the present disclosure discover that the capacitor is conducive to maintaining the state of the liquid crystal molecules in the liquid crystal layer LC. Optionally, the orthographic projection of the first electrode E1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1. Optionally, the orthographic projection of the second electrode E2 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1.

Figure 5:
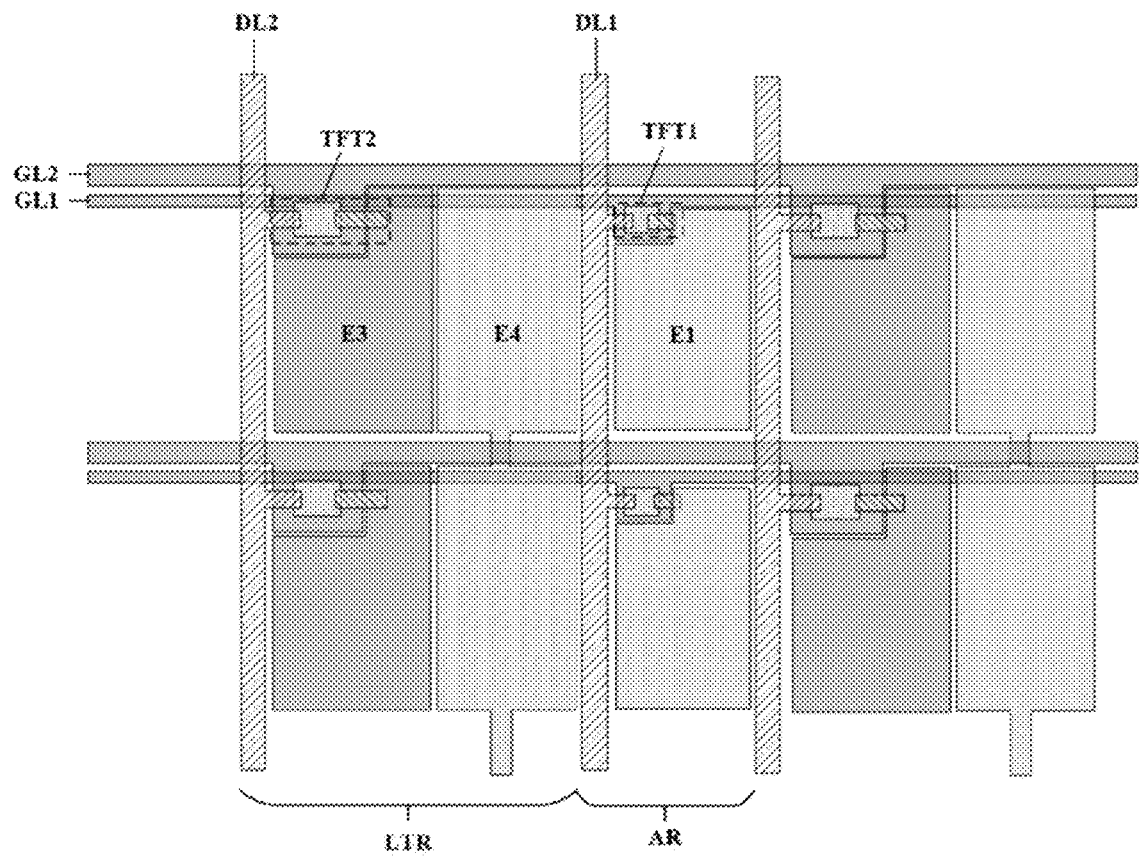
FIG. 5 is a diagram illustrating a layout of signal lines and electrodes in a display panel in some embodiments according to the present disclosure.

FIG. 5 is a diagram illustrating a layout of signal lines and electrodes in a display panel in some embodiments according to the present disclosure. Referring to FIG. 5, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 6:
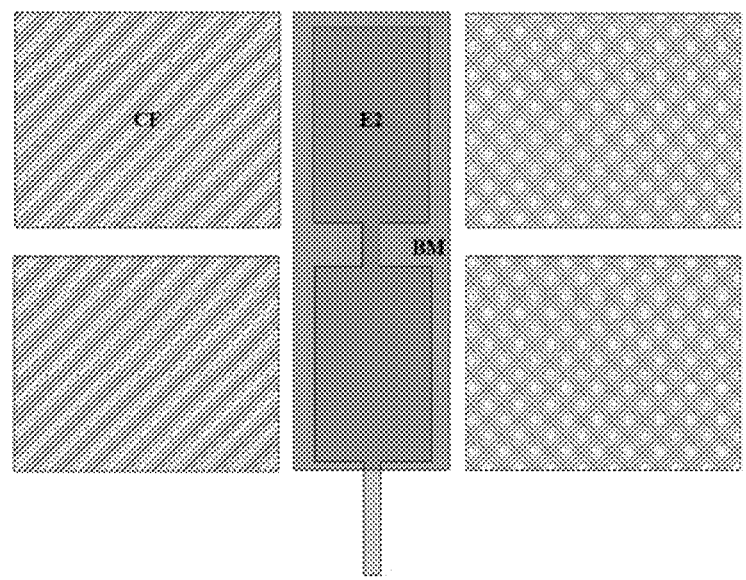
FIG. 6 is a plan view of a second electrode, a black matrix, and a color filter in a display panel in some embodiments according to the present disclosure.

FIG. 6 is a plan view of a second electrode, a black matrix, and a color filter in a display panel in some embodiments according to the present disclosure. Referring to FIG. 6, in some embodiments, an orthographic projection of the black matrix BM on a base substrate substantially covers (e.g., covers at least 75% of, covers at least 80% of, covers at least 85% of, covers at least 90% of, covers at least 95% of, covers at least 99% of, or completely covers) an orthographic projection of the second electrode E2 on the base substrate. Optionally, the orthographic projection of the second electrode E2 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the color filter CF on the base substrate.

Figure 7:
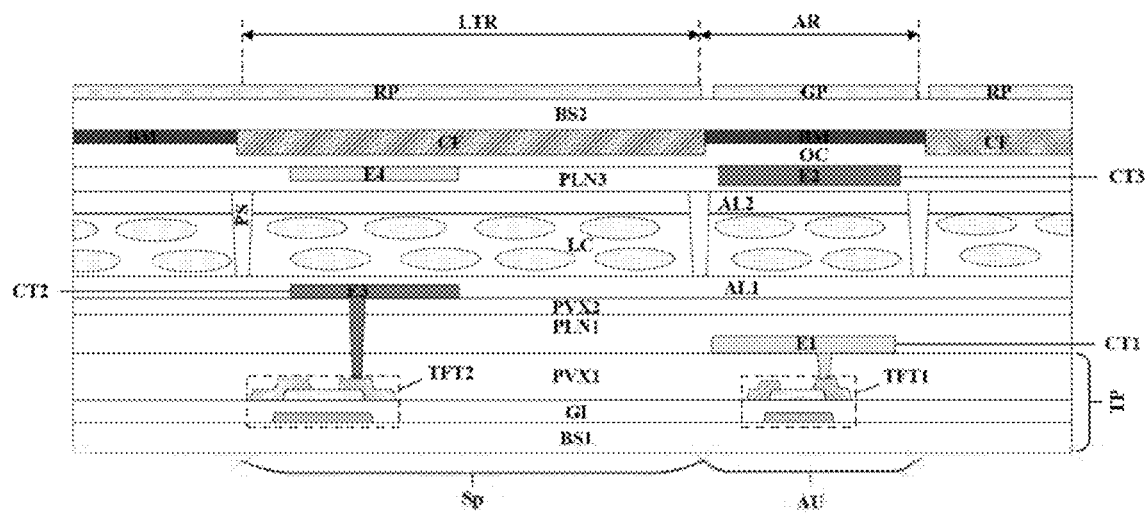
FIG. 7 is a diagram illustrating the structure of a display panel in some embodiments according to the present disclosure.

FIG. 7 is a diagram illustrating the structure of a display panel in some embodiments according to the present disclosure. Referring to FIG. 7, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode F3 connected to the second transistor TFT2, and a fourth electrode F4. In some embodiments, the third electrode E3 functions as a pixel electrode, and the fourth electrode F4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is a Twisted Nematic (TN) display panel. In some embodiments, a respective subpixel of the plurality of subpixels Sp includes a first base substrate BS1, a second transistor TFT2 on the first base substrate BS1, at least one of a first passivation layer PVX1, a first planarization layer PLN1, or a second passivation layer PVX2 on a side of the second transistor TFT2 away from the first base substrate BS1, a third electrode E3 on a side of the at least one of the first passivation layer PVX1, the first planarization layer PLN1, or the second passivation layer PVX2 away from the first base substrate BS1, a first alignment layer AL1 on a side of the third electrode E3 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a fourth electrode E4 on a side of the second alignment layer AL2 away from the first base substrate BS1, a color filter CF on a side of the fourth electrode E4 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the fourth electrode E4 away from the first base substrate BS1, and on a side of the color filter CF closer to the first base substrate BS1. Optionally, the display panel further includes a third planarization layer PLN3 on a side of the second alignment layer AL2 away from the first base substrate BS1, and on a side of the fourth electrode F4 closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 on a side of the first passivation layer PVX1 away from the first base substrate BS1, at least one of a first planarization layer PLN1 or a second passivation layer PVX2 on a side of the first electrode E1 away from the first base substrate BS1, a first alignment layer AL1 on a side of the at least one of the first planarization layer PLN1 or the second passivation layer PVX2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a second electrode E2 on a side of the second alignment layer AL2 away from the first base substrate BS1, a black matrix BM on a side of the second electrode F2 away from the first base substrate BS1, a second base substrate BS2 on a side of the black matrix BM away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second electrode E2 away from the first base substrate BS1, and on a side of the black matrix BM closer to the first base substrate BS1. Optionally, the display panel further includes a third planarization layer PLN3 on a side of the second alignment layer AL2 away from the first base substrate BS1, and on a side of the second electrode E2 closer to the first base substrate BS1.

In some embodiments, the fourth electrode E4 of the respective subpixel is in a same layer as the second electrode E2 of the respective antenna unit. In some embodiments, the third electrode E3 of the respective subpixel is in a layer different from the first electrode E1 of the respective antenna unit.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a third conductive layer CT3 on a side of the liquid crystal layer LC away from the transistor plate TP, a color filter CF and a black matrix BM on a side of the third conductive layer CT3 away from the transistor plate TP, and a radiating plate RP and a ground plate GP on a side of the color filter CF and the black matrix BM away from the transistor plate TP.

In some embodiments, the third electrode E3 and the fourth electrode F4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the first electrode E1 in the antenna region AR. In some embodiments, the second conductive layer CT2 includes the third electrode F3 in the light transmissive region LTR. In some embodiments, the third conductive layer CT3 includes the fourth electrode F4 in the light transmissive region LTR and the second electrode E2 in the antenna region AR. The fourth electrode E4 and the second electrode E2 are in a same layer. The third electrode E3 and the first electrode E1 are in different layers.

Referring to FIG. 7, in some embodiments, an orthographic projection of the first electrode E1 on the first base substrate BS1 at least partially overlaps with an orthographic projection of the second electrode E2 on the first base substrate BS1, forming a capacitor. The inventors of the present disclosure discover that the capacitor is conducive to maintaining the state of the liquid crystal molecules in the liquid crystal layer LC. Optionally, the orthographic projection of the first electrode E1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1. Optionally, the orthographic projection of the second electrode E2 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1.

Referring to FIG. 7, in some embodiments, an orthographic projection of the third electrode E3 on the first base substrate BS1 at least partially overlaps with an orthographic projection of the fourth electrode E4 on the first base substrate BS1. Optionally, the orthographic projection of the third electrode E3 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1. Optionally, the orthographic projection of the fourth electrode E4 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1.

Figure 8:
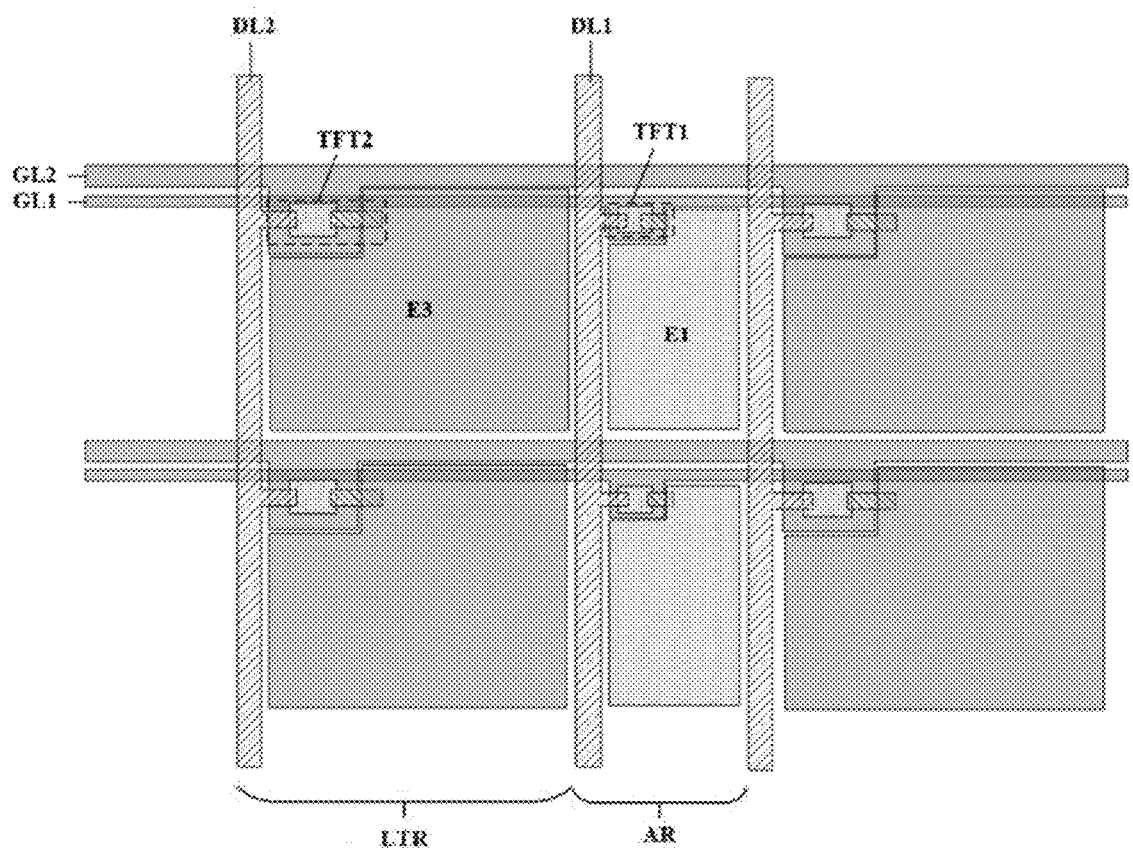
FIG. 8 is a diagram illustrating a layout of signal lines and electrodes in a display panel in some embodiments according to the present disclosure.

FIG. 8 is a diagram illustrating a layout of signal lines and electrodes in a display panel in some embodiments according to the present disclosure. Referring to FIG. 8, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 9:
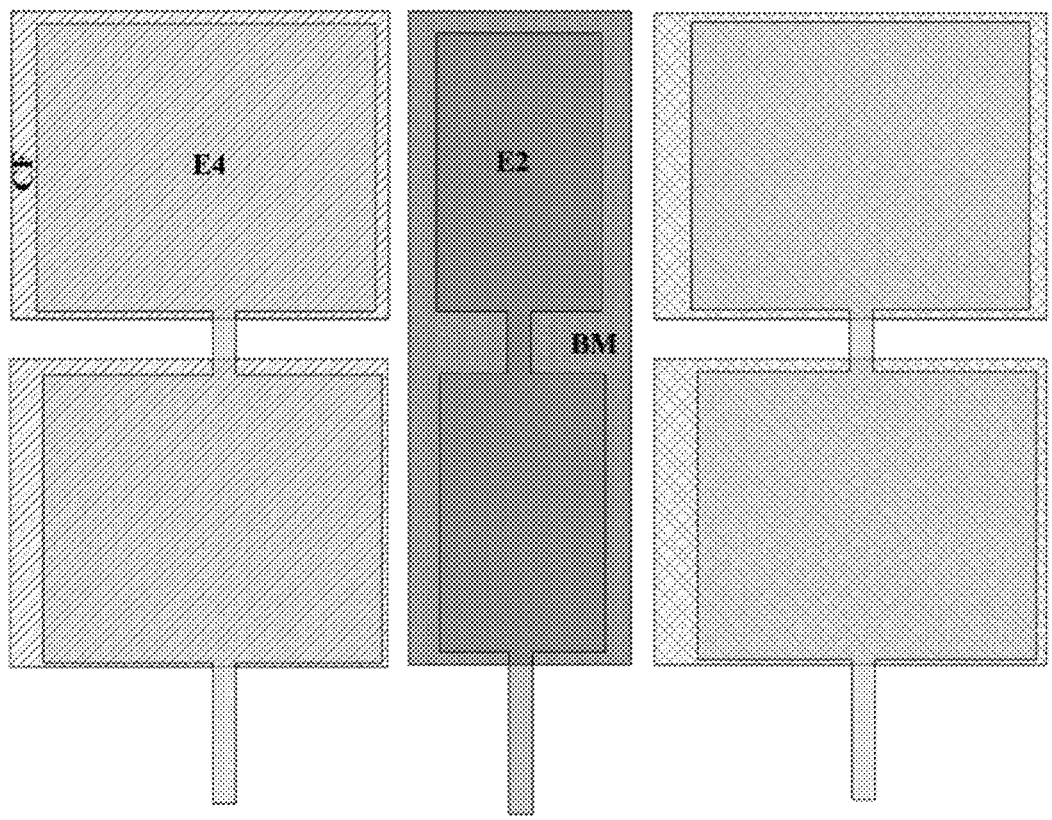
FIG. 9 is a plan view of a second electrode, a fourth electrode, a black matrix, and a color filter in a display panel in some embodiments according to the present disclosure.

FIG. 9 is a plan view of a second electrode, a fourth electrode, a black matrix, and a color filter in a display panel in some embodiments according to the present disclosure. Referring to FIG. 9, in some embodiments, an orthographic projection of the black matrix BM on a base substrate substantially covers (e.g., covers at least 75% of, covers at least 80% of, covers at least 85% of, covers at least 90% of, covers at least 95% of, covers at least 99% of, or completely covers) an orthographic projection of the second electrode E2 on the base substrate. Optionally, the orthographic projection of the second electrode E2 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the color filter CF on the base substrate.

In some embodiments, an orthographic projection of the color filter CF on a base substrate substantially covers (e.g., covers at least 75% of, covers at least 80% of, covers at least 85% of, covers at least 90% of, covers at least 95% of, covers at least 99% of, or completely covers) an orthographic projection of the fourth electrode E4 on the base substrate. Optionally, the orthographic projection of the fourth electrode E4 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the black matrix BM on the base substrate.

Figure 10:
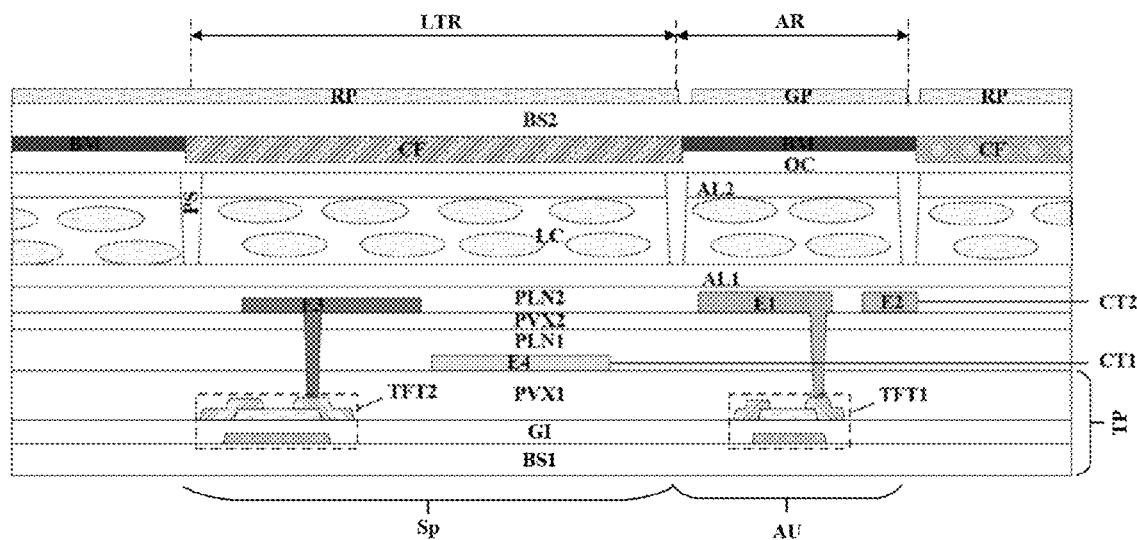
FIG. 10 is a diagram illustrating the structure of a display panel in some embodiments according to the present disclosure.

FIG. 10 is a diagram illustrating the structure of a display panel in some embodiments according to the present disclosure. Referring to FIG. 10, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode E3 connected to the second transistor TFT2, and a fourth electrode E4. In some embodiments, the third electrode E3 functions as a pixel electrode, and the fourth electrode E4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode F4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode F4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is an Advanced Super Dimension Switch (ADS) display panel. In some embodiments, a respective subpixel of the plurality of subpixels Sp includes a first base substrate BS1, a second transistor TFT2 on the first base substrate BS1, a first passivation layer PVX1 on a side of the second transistor TFT2 away from the first base substrate BS1, a fourth electrode E4 on a side of the first passivation layer PVX1 away from the first base substrate BS1, at least one of a first planarization layer PLN1 or a second passivation layer PVX2 on a side of the fourth electrode E4 away from the first base substrate BS1, a third electrode E3 on a side of the at least one of the first planarization layer PLN1 or the second passivation layer PVX2 away from the first base substrate BS1, a second planarization layer PLN2 on a side of the third electrode E3 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a color filter CF on a side of the second alignment layer AL2 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, at least one of a first planarization layer PLN1 or a second passivation layer PVX2 on a side of the first passivation layer PVX1 away from the first base substrate BS1, a first electrode E1 and a second electrode E2 on a side of the at least one of the first planarization layer PLN1 or the second passivation layer PVX2 away from the first base substrate BS1, a second planarization layer PLN2 on a side of the second electrode E2 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a black matrix BM on a side of the second alignment layer AL2 away from the first base substrate BS1, a second base substrate BS2 on a side of the color filter CF away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second alignment layer AL2 away from the first base substrate BS1, and on a side of the black matrix BM closer to the first base substrate BS1.

In some embodiments, the first electrode E1 and the second electrode E2 of the respective antenna unit are in a same layer. In some embodiments, the third electrode E3 of the respective subpixel is in a same layer as the first electrode E1 and the second electrode E2 of the respective antenna unit.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a color filter CF and a black matrix BM on a side of the liquid crystal layer LC away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the fourth electrode E4 in the light transmissive region LTR. In some embodiments, the second conductive layer CT2 includes the third electrode E3 in the light transmissive region LTR, the first electrode E1 in the antenna region AR, and the second electrode E2 in the antenna region AR. The third electrode E3, the first electrode E1, and the second electrode E2 are in a same layer.

Referring to FIG. 10, in some embodiments, an orthographic projection of the first electrode E1 on the first base substrate BS1 is non-overlapping with an orthographic projection of the second electrode E2 on the first base substrate BS1.

Figure 11:
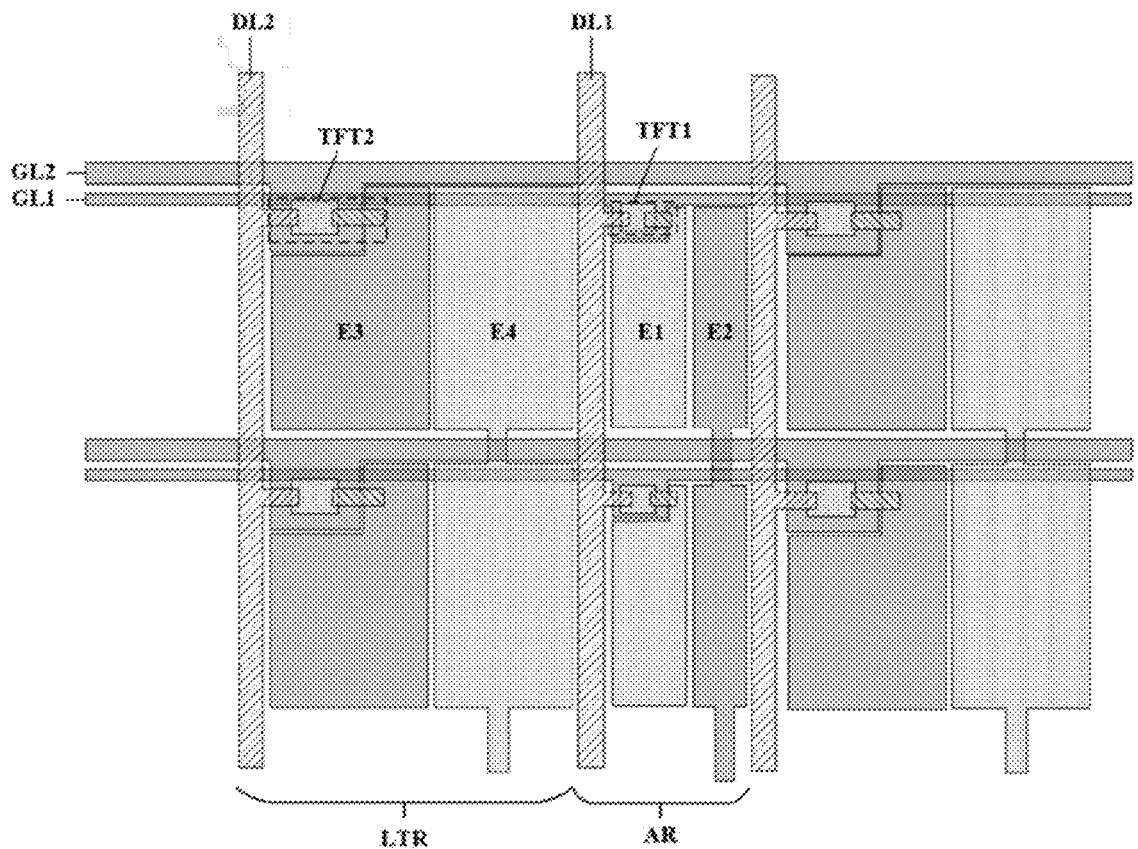
FIG. 11 is a diagram illustrating a layout of signal lines and electrodes in a display panel in some embodiments according to the present disclosure.

FIG. 11 is a diagram illustrating a layout of signal lines and electrodes in a display panel in some embodiments according to the present disclosure. Referring to FIG. 11, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 12:
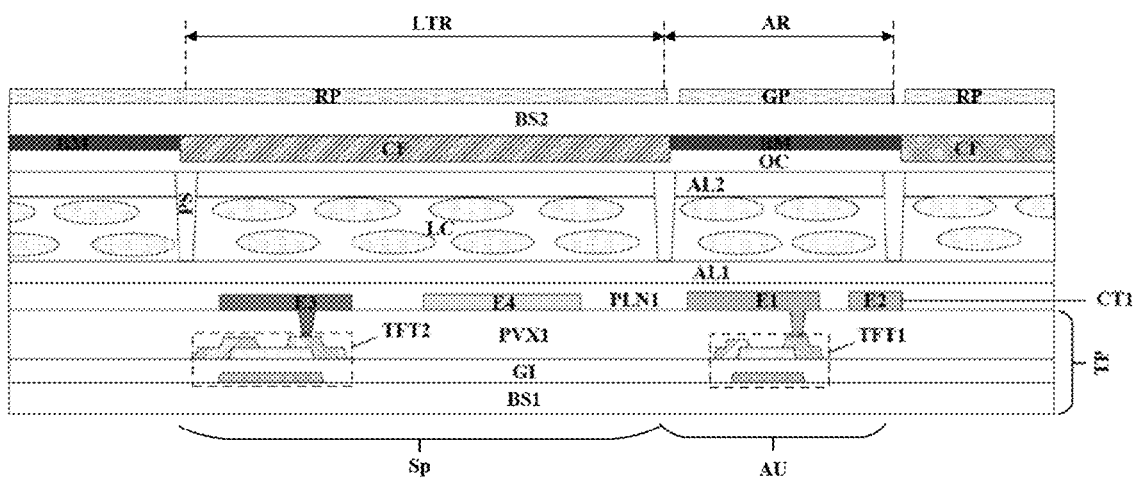
FIG. 12 is a diagram illustrating the structure of a display panel in some embodiments according to the present disclosure.

FIG. 12 is a diagram illustrating the structure of a display panel in some embodiments according to the present disclosure. Referring to FIG. 12, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode E3 connected to the second transistor TFT2, and a fourth electrode F4. In some embodiments, the third electrode E3 functions as a pixel electrode, and the fourth electrode F4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode F4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is an In-Plane Switching (IPS) display panel. In some embodiments, a respective subpixel of the plurality of subpixels Sp includes a first base substrate BS1, a second transistor TFT2 on the first base substrate BS1, a first passivation layer PVX1 on a side of the second transistor TFT2 away from the first base substrate BS1, a third electrode F3 and a fourth electrode F4 on a side of the first passivation layer PVX1 away from the first base substrate BS1, a first planarization layer PLN1 on a side of the third electrode E3 and the fourth electrode E4 away from the first base substrate BS1, a first alignment layer AL1 on a side of the first planarization layer PLN1 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a color filter CF on a side of the second alignment layer AL2 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 and a second electrode E2 on a side of the first passivation layer PVX1 away from the first base substrate BS1, a first planarization layer PLN1 on a side of the first electrode E1 and the second electrode E2 away from the first base substrate BS1, a first alignment layer AL1 on a side of the first planarization layer PLN1 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a black matrix BM on a side of the second alignment layer AL2 away from the first base substrate BS1, a second base substrate BS2 on a side of the color filter CF away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second alignment layer AL2 away from the first base substrate BS1, and on a side of the black matrix BM closer to the first base substrate BS1.

In some embodiments, the first electrode E1 and the second electrode E2 of the respective antenna unit are in a same layer. In some embodiments, the third electrode E3 and the fourth electrode F4 of the respective subpixel are in a same layer. In some embodiments, the first electrode E1 and the second electrode E2 of the respective antenna unit, and the third electrode E3 and the fourth electrode E4 of the respective subpixel are in a same layer.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a liquid crystal layer LC on a side of the first planarization layer PLN1 away from the transistor plate TP, a color filter CF and a black matrix BM on a side of the liquid crystal layer LC away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the third electrode E3 and the fourth electrode E4 in the light transmissive region LTR, and the first electrode E1 and the second electrode E2 in the antenna region AR. The first electrode E1, the second electrode E2, the third electrode E3, and the fourth electrode E4 are in a same layer.

Referring to FIG. 12, in some embodiments, an orthographic projection of the first electrode E1 on the first base substrate BS1 is non-overlapping with an orthographic projection of the second electrode E2 on the first base substrate BS1.

Figure 13:
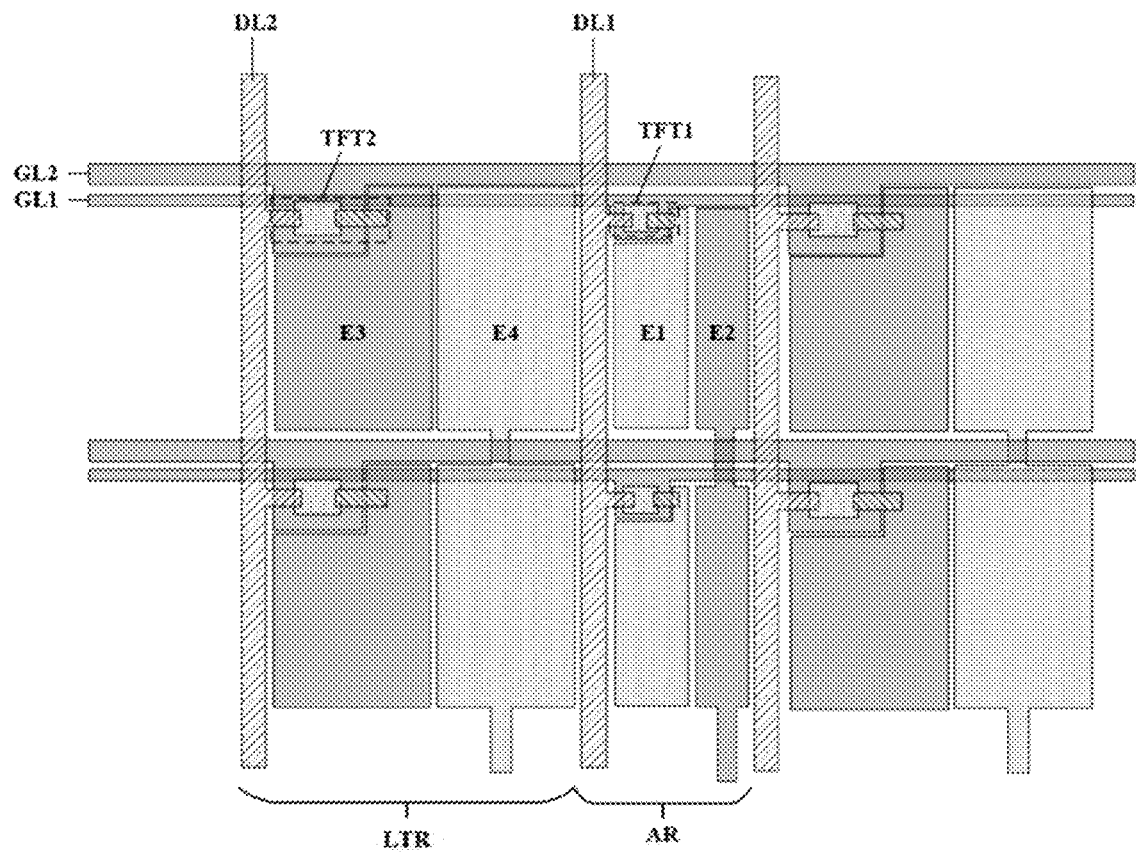
FIG. 13 is a diagram illustrating a layout of signal lines and electrodes in a display panel in some embodiments according to the present disclosure.

FIG. 13 is a diagram illustrating a layout of signal lines and electrodes in a display panel in some embodiments according to the present disclosure. Referring to FIG. 13, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 14:
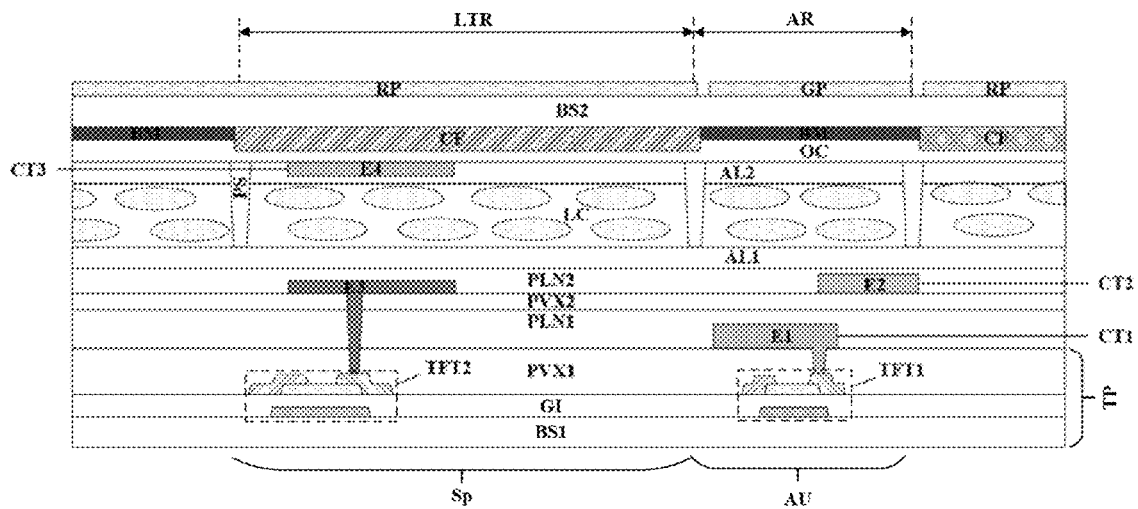
FIG. 14 is a diagram illustrating the structure of a display panel in some embodiments according to the present disclosure.

FIG. 14 is a diagram illustrating the structure of a display panel in some embodiments according to the present disclosure. Referring to FIG. 14, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode F2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode F3 connected to the second transistor TFT2, and a fourth electrode F4. In some embodiments, the third electrode E3 functions as a pixel electrode, and the fourth electrode E4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode F4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is a Twisted Nematic (TN) display panel. In some embodiments, a respective subpixel of the plurality of subpixels Sp includes a first base substrate BS1, a second transistor TFT2 on the first base substrate BS1, at least one of a first passivation layer PVX1, a first planarization layer PLN1, or a second passivation layer PVX2 on a side of the second transistor TFT2 away from the first base substrate BS1, a third electrode E3 on a side of the at least one of the first passivation layer PVX1, the first planarization layer PLN1, or the second passivation layer PVX2 away from the first base substrate BS1, a first alignment layer AL1 on a side of the third electrode E3 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a fourth electrode E4 on a side of the second alignment layer AL2 away from the first base substrate BS1, a color filter CF on a side of the fourth electrode E4 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 on a side of the first passivation layer PVX1 away from the first base substrate BS1, at least one of a first planarization layer PLN1 or a second passivation layer PVX2 on a side of the first electrode E1 away from the first base substrate BS1, a second electrode E2 on a side of the at least one of the first planarization layer PLN1 or the second passivation layer PVX2 away from the first base substrate BS1, a second planarization layer PLN2 on a side of the second electrode E2 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a black matrix BM on a side of the second alignment layer AL2 away from the first base substrate BS1, a second base substrate BS2 on a side of the color filter CF away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second alignment layer AL2 away from the first base substrate BS1, and on a side of the black matrix BM closer to the first base substrate BS1.

In some embodiments, the third electrode E3 of the respective subpixel is in a same layer as the second electrode E2 of the respective antenna unit. In some embodiments, the fourth electrode E4 of the respective subpixel is in a layer different from the first electrode E1 of the respective antenna unit.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a third conductive layer CT3 on a side of the liquid crystal layer LC away from the transistor plate TP, a color filter CF and a black matrix BM on a side of the third conductive layer CT3 away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the first electrode E1 in the antenna region AR. In some embodiments, the second conductive layer CT2 includes the third electrode E3 in the light transmissive region LTR and the second electrode E2 in the antenna region AR. In some embodiments, the third conductive layer CT3 includes the fourth electrode E4 in the light transmissive region LTR. The third electrode E3 and the second electrode E2 are in a same layer. The fourth electrode E4 and the first electrode E1 are in different layers.

Referring to FIG. 14, in some embodiments, an orthographic projection of the first electrode E1 on the first base substrate BS1 at least partially overlaps with an orthographic projection of the second electrode E2 on the first base substrate BS1, forming a capacitor. The inventors of the present disclosure discover that the capacitor is conducive to maintaining the state of the liquid crystal molecules in the liquid crystal layer LC. Optionally, the orthographic projection of the first electrode E1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1. Optionally, the orthographic projection of the second electrode E2 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1.

Referring to FIG. 14, in some embodiments, an orthographic projection of the third electrode E3 on the first base substrate BS1 at least partially overlaps with an orthographic projection of the fourth electrode E4 on the first base substrate BS1. Optionally, the orthographic projection of the third electrode E3 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1. Optionally, the orthographic projection of the fourth electrode E4 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1.

Figure 15:
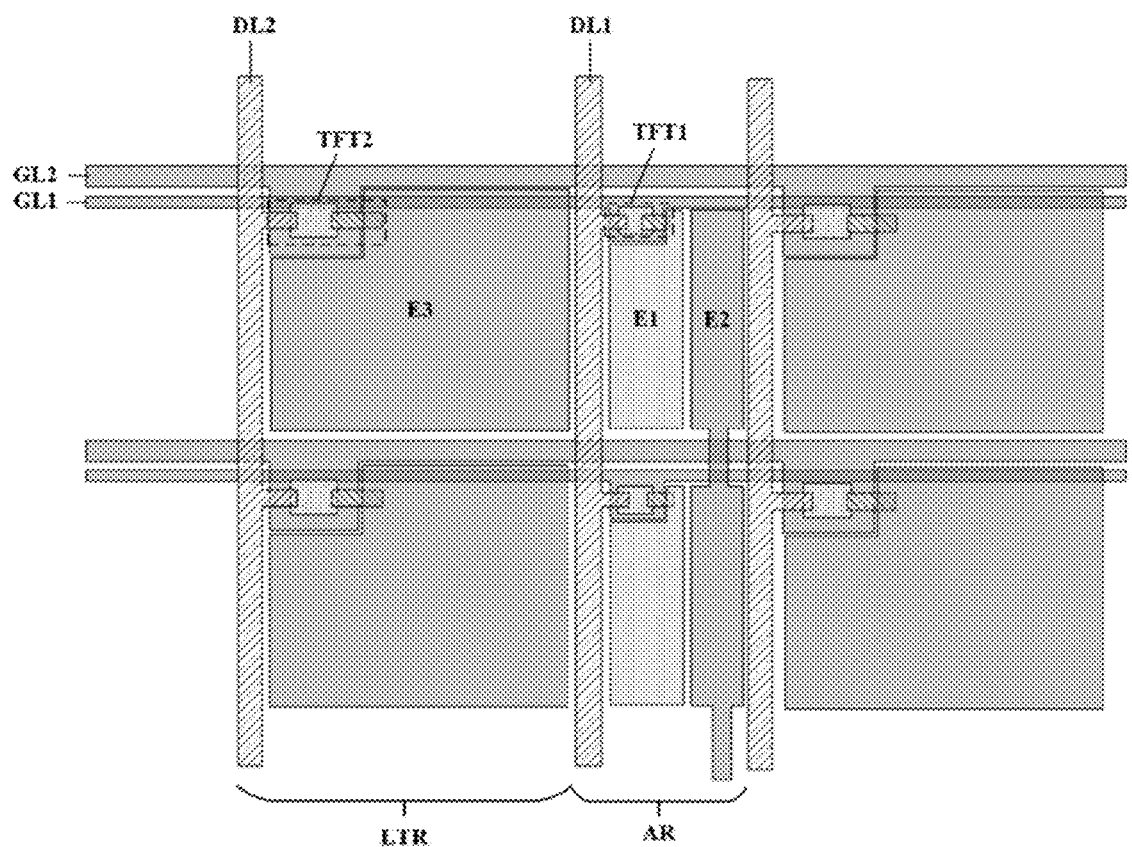
FIG. 15 is a diagram illustrating a layout of signal lines and electrodes in a display panel in some embodiments according to the present disclosure.

FIG. 15 is a diagram illustrating a layout of signal lines and electrodes in a display panel in some embodiments according to the present disclosure. Referring to FIG. 15, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 16:
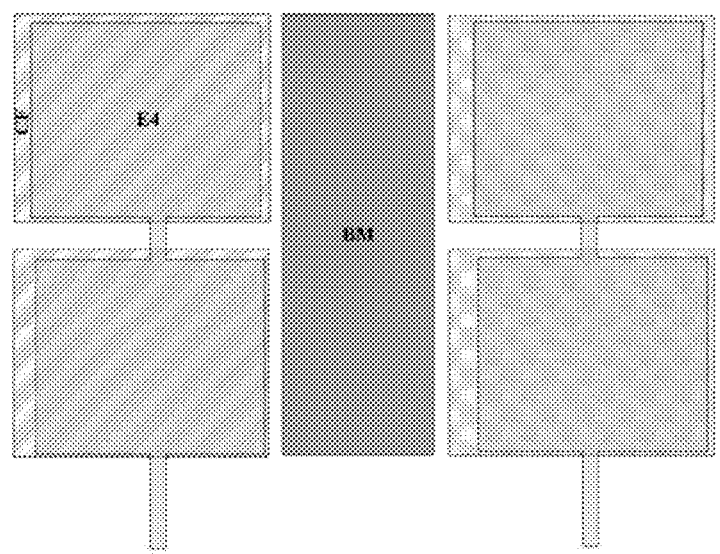
FIG. 16 is a plan view of a fourth electrode, a black matrix, and a color filter in a display panel in some embodiments according to the present disclosure.

FIG. 16 is a plan view of a fourth electrode, a black matrix, and a color filter in a display panel in some embodiments according to the present disclosure. Referring to FIG. 16, in some embodiments, an orthographic projection of the color filter CF on a base substrate substantially covers (e.g., covers at least 75% of, covers at least 80% of, covers at least 85% of, covers at least 90% of, covers at least 95% of, covers at least 99% of, or completely covers) an orthographic projection of the fourth electrode E4 on the base substrate. Optionally, the orthographic projection of the fourth electrode E4 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the black matrix BM on the base substrate.

Figure 17:
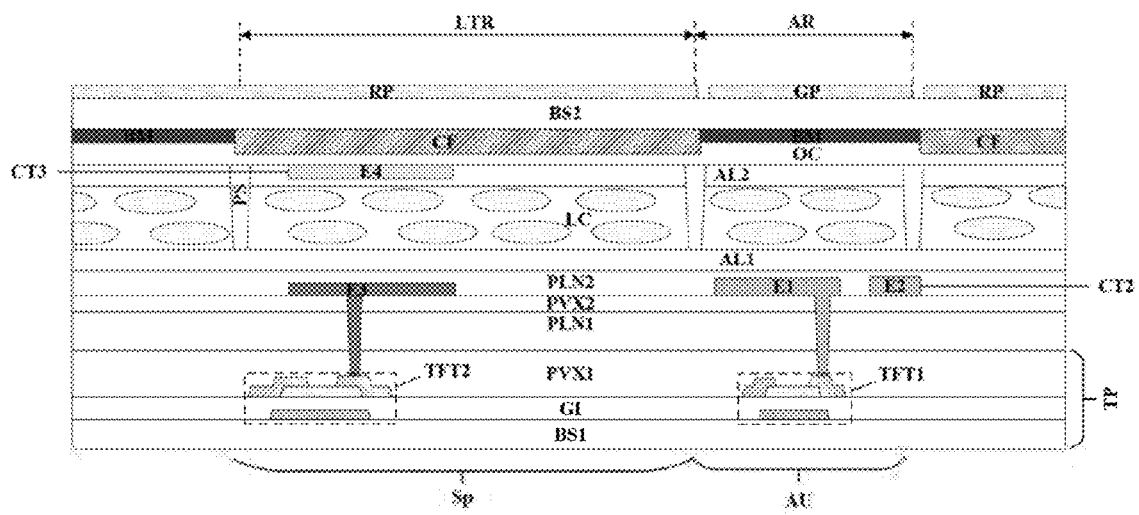
FIG. 17 is a diagram illustrating the structure of a display panel in some embodiments according to the present disclosure.

FIG. 17 is a diagram illustrating the structure of a display panel in some embodiments according to the present disclosure. Referring to FIG. 17, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode F2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode F3 connected to the second transistor TFT2, and a fourth electrode F4. In some embodiments, the third electrode E3 functions as a pixel electrode, and the fourth electrode F4 functions as a common electrode.

In some embodiments, the display panel further includes a color filter CF and a black matrix BM. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, an orthographic projection of the black matrix BM on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix BM on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other.

In some embodiments, an orthographic projection of the black matrix BM on the first base substrate BS1 at least partially overlaps with an orthographic projection of the ground plate GP on the first base substrate BS1. Optionally, the orthographic projection of the black matrix BM on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the color filter CF on the first base substrate BS1 at least partially overlaps with an orthographic projection of the radiating plate RP on the first base substrate BS1. Optionally, the orthographic projection of the radiating plate RP on the first base substrate BS1 partially overlaps with a portion of the black matrix BM in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the radiating plate RP on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the radiating plate RP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, the display panel is a Twisted Nematic (TN) display panel. In some embodiments, a respective subpixel of the plurality of subpixels Sp includes a first base substrate BS1, a second transistor TFT2 on the first base substrate BS1, at least one of a first passivation layer PVX1, a first planarization layer PLN1, or a second passivation layer PVX2 on a side of the second transistor TFT2 away from the first base substrate BS1, a third electrode E3 on a side of the at least one of the first passivation layer PVX1, the first planarization layer PLN1, or the second passivation layer PVX2 away from the first base substrate BS1, a second planarization layer PLN2 on a side of the third electrode E3 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a fourth electrode E4 on a side of the second alignment layer AL2 away from the first base substrate BS1, a color filter CF on a side of the fourth electrode E4 away from the first base substrate BS1, a second base substrate BS2 on a side of the color filter CF away from the first base substrate BS1, and a radiating plate RP on a side of the second base substrate BS2 away from the first base substrate BS1. The third electrode E3 is connected to a drain electrode of the second transistor TFT2. Optionally, the display panel further includes an overcoat layer OC on a side of the second alignment layer AL2 away from the first base substrate BS1, and on a side of the color filter CF closer to the first base substrate BS1.

In some embodiments, a respective antenna unit of the plurality of antenna units AU includes a first base substrate BS1, a first transistor TFT1 on the first base substrate BS1, at least one of a first passivation layer PVX1, a first planarization layer PLN1, or a second passivation layer PVX2 on a side of on a side of the first transistor TFT1 away from the first base substrate BS1, a first electrode E1 and a second electrode E2 on a side of the at least one of the first passivation layer PVX1, the first planarization layer PLN1, or the second passivation layer PVX2 away from the first base substrate BS1, a second planarization layer PLN2 on a side of the first electrode E1 and the second electrode E2 away from the first base substrate BS1, a first alignment layer AL1 on a side of the second planarization layer PLN2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a black matrix BM on a side of the second alignment layer AL2 away from the first base substrate BS1, a second base substrate BS2 on a side of the color filter CF away from the first base substrate BS1, and a ground plate GP on a side of the second base substrate BS2 away from the first base substrate BS1. The first electrode E1 is connected to a drain electrode of the first transistor TFT1. Optionally, the display panel further includes an overcoat layer OC on a side of the second alignment layer AL2 away from the first base substrate BS1, and on a side of the black matrix BM closer to the first base substrate BS1.

In some embodiments, the first electrode E1 and the second electrode E2 of the respective antenna unit are in a same layer. In some embodiments, the third electrode E3 of the respective subpixel is in a same layer as the first electrode E1 and the second electrode E2 of the respective antenna unit. In some embodiments, the fourth electrode E4 of the respective subpixel is in a layer different from the first electrode E1 and the second electrode E2 of the respective antenna unit.

In some embodiments, the display panel includes a light transmissive region LTR and an antenna region AR outside of the light transmissive region LTR. In some embodiments, the display panel includes a transistor plate TP, a first planarization layer PLN1 on the transistor plate TP, a second conductive layer CT2 on a side of the first planarization layer PLN1 away from the transistor plate TP, a liquid crystal layer LC on a side of the second conductive layer CT2 away from the transistor plate TP, a third conductive layer CT3 on a side of the liquid crystal layer LC away from the transistor plate TP, a color filter CF and a black matrix BM on a side of the third conductive layer CT3 away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the second conductive layer CT2 includes the first electrode E1 and the second electrode E2 in the antenna region AR, and the third electrode F3 in the light transmissive region LTR. In some embodiments, the third conductive layer CT3 includes the fourth electrode E4 in the light transmissive region LTR. The first electrode E1, the second electrode E2, and the third electrode E3 and are in a same layer.

Referring to FIG. 17, in some embodiments, an orthographic projection of the first electrode E1 on the first base substrate BS1 is non-overlapping with an orthographic projection of the second electrode E2 on the first base substrate BS1.

Referring to FIG. 17, in some embodiments, an orthographic projection of the third electrode E3 on the first base substrate BS1 at least partially overlaps with an orthographic projection of the fourth electrode E4 on the first base substrate BS1. Optionally, the orthographic projection of the third electrode E3 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1. Optionally, the orthographic projection of the fourth electrode E4 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1.

Figure 18:
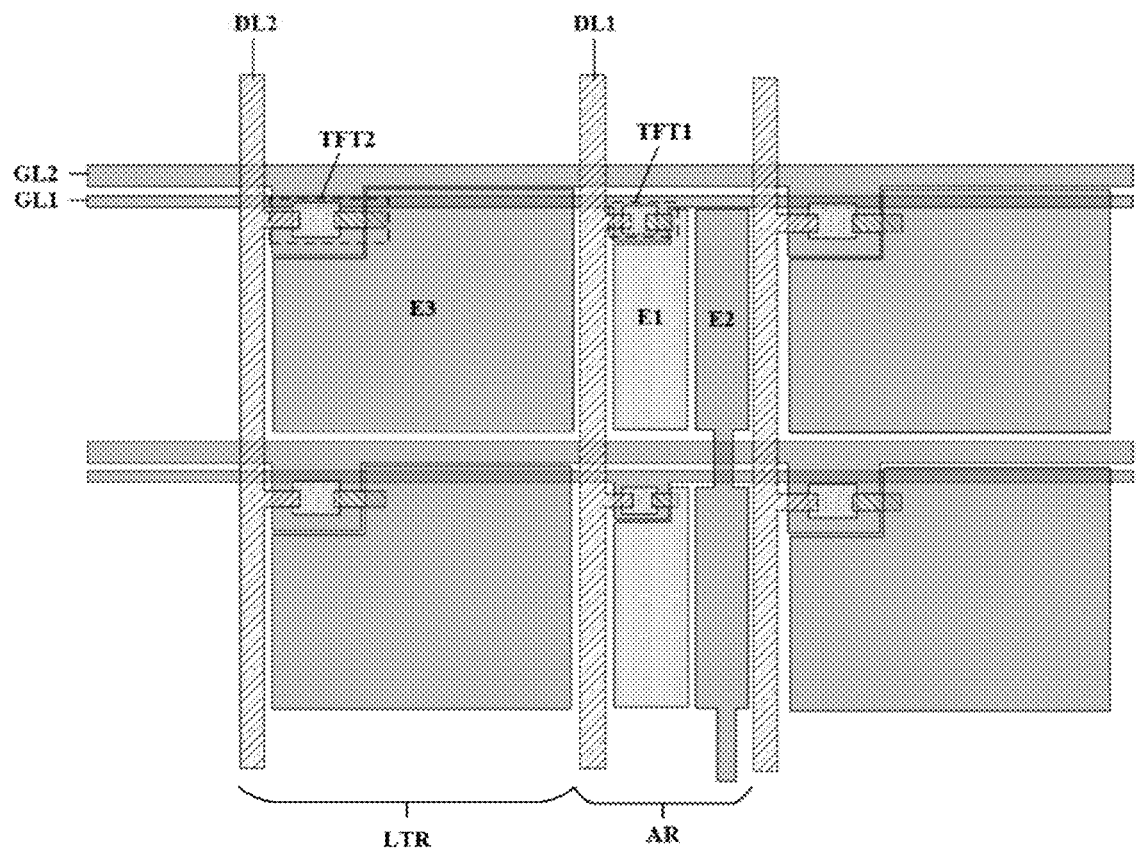
FIG. 18 is a diagram illustrating a layout of signal lines and electrodes in a display panel in some embodiments according to the present disclosure.

FIG. 18 is a diagram illustrating a layout of signal lines and electrodes in a display panel in some embodiments according to the present disclosure. Referring to FIG. 18, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 19:
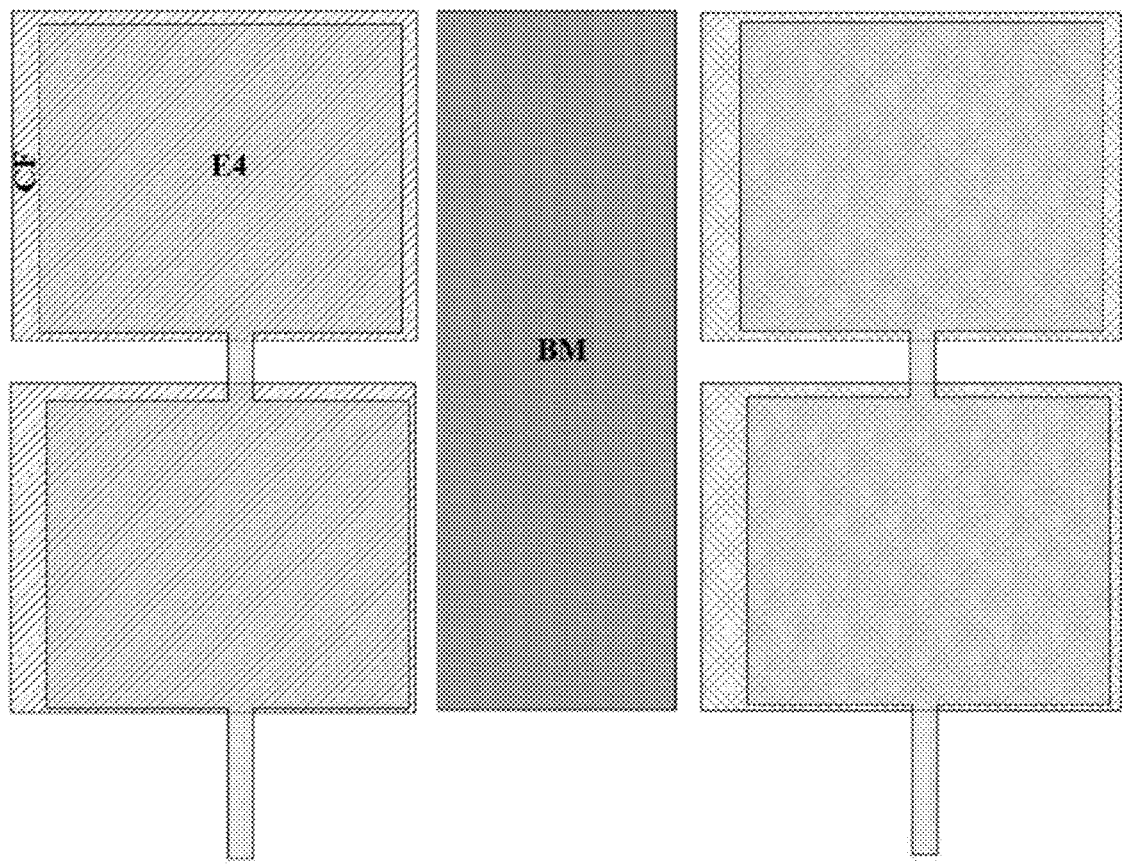
FIG. 19 is a plan view of a fourth electrode, a black matrix, and a color filter in a display panel in some embodiments according to the present disclosure.

FIG. 19 is a plan view of a fourth electrode, a black matrix, and a color filter in a display panel in some embodiments according to the present disclosure. Referring to FIG. 19, in some embodiments, an orthographic projection of the color filter CF on a base substrate substantially covers (e.g., covers at least 75% of, covers at least 80% of, covers at least 85% of, covers at least 90% of, covers at least 95% of, covers at least 99% of, or completely covers) an orthographic projection of the fourth electrode E4 on the base substrate. Optionally, the orthographic projection of the fourth electrode E4 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the black matrix BM on the base substrate.

Figure 20:
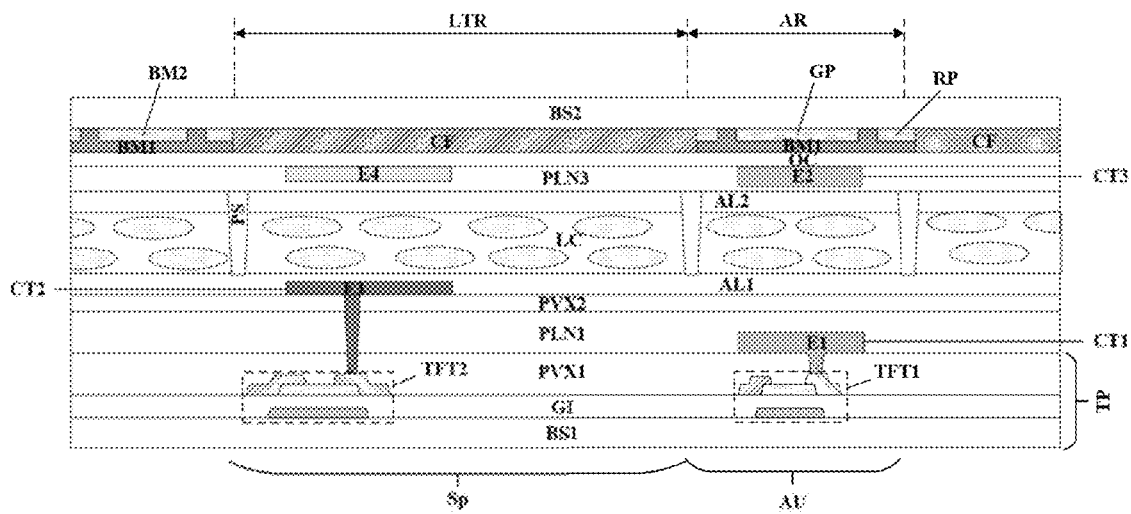
FIG. 20 is a diagram illustrating the structure of a display panel in some embodiments according to the present disclosure.

FIG. 20 is a diagram illustrating the structure of a display panel in some embodiments according to the present disclosure. Referring to FIG. 20, the display panel in some embodiments includes a plurality of subpixels Sp and a plurality of antenna units AU. In some embodiments, a respective antenna unit of the plurality of antenna units AU includes a first base substrate BS1, a first transistor TFT1 on the first base substrate BS1, a first electrode E1 connected to the first transistor TFT1, and a second electrode E2. In some embodiments, the display panel further includes a liquid crystal layer LC extending through the plurality of subpixels Sp and the plurality of antenna units AU. The first electrode E1 and the second electrode E2 are configured to apply an electric field across a portion of the liquid crystal layer LC. This electric field induces changes in the refractive index of the liquid crystal material, which in turn alters the phase of the transmitted electromagnetic waves. By adjusting the voltage applied to the first electrode E1, the phase shift of the waves passing through the liquid crystal layer LC can be precisely controlled. In some embodiments, the first electrode E1 is connected to a drain electrode of the first transistor TFT1, and is configured to be provided with a first data signal.

In some embodiments, the second electrode E2 functions as a feed line for the respective antenna unit. In some embodiments, the second electrode E2 is configured to transmit and/or receive electromagnetic signals. The liquid crystal layer LC is configured to adjust the phase of an input signal, e.g., from the second electrode E2. The first electrode E1 and the liquid crystal layer LC in combination are configured to introduce a controlled phase shift to the signal passing through it.

In some embodiments, a respective subpixel of the plurality of subpixels Sp includes the first base substrate BS1, a second transistor TFT2 on the first base substrate BS1, a third electrode F3 connected to the second transistor TFT2, and a fourth electrode F4. In some embodiments, the third electrode E3 functions as a pixel electrode, and the fourth electrode F4 functions as a common electrode.

In some embodiments, the display panel further includes a color filter CF and a black matrix. The color filter CF in some embodiments includes a plurality of color filter blocks. A respective color filter block of the plurality of color filter blocks is at least partially in a respective subpixel of the plurality of subpixels Sp. An orthographic projection of the respective color filter block on the first base substrate BS1 at least partially overlaps with an orthographic projection of the third electrode E3 on the first base substrate BS1, and at least partially overlaps with an orthographic projection of the fourth electrode E4 on the first base substrate BS1.

In some embodiments, the black matrix includes a first black matrix layer BM1 on the overcoat layer OC, and a second black matrix layer BM2 on a side of the first black matrix layer BM1 away from the overcoat layer OC. Optionally, an orthographic projection of the first black matrix layer BM1 on the first base substrate BS1 covers an orthographic projection of the second black matrix layer BM2 on the first base substrate BS1. In some embodiments, the second black matrix layer BM2 is in a same layer as the ground plate GP and/or the radiating plate RP. Optionally, the ground plate GP and/or the radiating plate RP are present in the antenna region AR. Optionally, the second black matrix layer BM2 is absent in the antenna region AR. Optionally, the second black matrix layer BM2 is present in a region outside of the light transmissive region LTR and outside of the antenna region AR.

In some embodiments, an orthographic projection of the first black matrix layer BM1 on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the first black matrix layer BM1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the first black matrix layer BM1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, an orthographic projection of the color filter CF on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, an orthographic projection of the black matrix (including the first black matrix layer BM1 and the second black matrix layer BM2) on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, an orthographic projection of the black matrix (including the first black matrix layer BM1 and the second black matrix layer BM2) on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the color filter CF on the first base substrate BS1 at least partially overlaps with an orthographic projection of the third electrode E3 on the first base substrate BS1, and at least partially overlaps with an orthographic projection of the fourth electrode E4 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1. Optionally, the orthographic projection of the color filter CF on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode E4 on the first base substrate BS1.

In some embodiments, the display panel further includes a ground plate GP and a radiating plate RP. In some embodiments, the ground plate GP and the radiating plate RP are spaced apart from each other. In one example depicted in FIG. 20, the ground plate GP and the radiating plate RP are spaced apart from each other by a portion of the first black matrix layer BM1.

In some embodiments, an orthographic projection of the first black matrix layer BM1 on the first base substrate BS1 at least partially overlaps with an orthographic projection of the ground plate GP on the first base substrate BS1. Optionally, the orthographic projection of the first black matrix layer BM1 on the first base substrate BS1 substantially covers (e.g., covers at least 75% of, covers at least 80% of, covers at least 85% of, covers at least 90% of, covers at least 95% of, covers at least 99% of, or completely covers) an orthographic projection of the ground plate GP on the first base substrate BS1.

In some embodiments, an orthographic projection of the first black matrix layer BM1 on the first base substrate BS1 at least partially overlaps with an orthographic projection of the radiating plate RP on the first base substrate BS1. Optionally, the orthographic projection of the second black matrix layer BM2 on the first base substrate BS1 partially overlaps with a portion of the first black matrix layer BM1 in a region where the first electrode E1 and the second electrode E2 are absent.

In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the first electrode E1 on the first base substrate BS1. In some embodiments, the orthographic projection of the radiating plate RP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the second electrode E2 on the first base substrate BS1.

In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the third electrode E3 on the first base substrate BS1. In some embodiments, the orthographic projection of the ground plate GP on the first base substrate BS1 is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) the orthographic projection of the fourth electrode E4 on the first base substrate BS1.

In some embodiments, an orthographic projection of the ground plate GP on the first base substrate BS1 at least partially overlaps with an orthographic projection of the first electrode E1 on the first base substrate BS1, and at least partially overlaps with an orthographic projection of the second electrode E2 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1. Optionally, the orthographic projection of the ground plate GP on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1.

Various appropriate black matrix materials may be used for forming the first black matrix layer BM1. Examples of appropriate black matrix materials for making the first black matrix layer BM1 include organic black materials such as black resins, black polyimide, black acrylics, black polycarbonate, black polyester, black polyolefin.

Various appropriate black matrix materials may be used for forming the second black matrix layer BM2. Examples of appropriate black matrix materials for making the second black matrix layer BM2 include metallic materials such as molybdenum, aluminum, and copper. In one example, a total thickness of the first black matrix layer BM1 and the second black matrix layer BM2 is approximately 1 μm.

In some embodiments, the display panel is a Twisted Nematic (TN) display panel. In some embodiments, a respective subpixel of the plurality of subpixels Sp includes a first base substrate BS1, a second transistor TFT2 on the first base substrate BS1, at least one of a first passivation layer PVX1, a first planarization layer PLN1, or a second passivation layer PVX2 on a side of the second transistor TFT2 away from the first base substrate BS1, a third electrode E3 on a side of the at least one of the first passivation layer PVX1, the first planarization layer PLN1, or the second passivation layer PVX2 away from the first base substrate BS1, a first alignment layer AL1 on a side of the third electrode E3 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a fourth electrode E4 on a side of the second alignment layer AL2 away from the first base substrate BS1, a color filter CF on a side of the fourth electrode E4 away from the first base substrate BS1, and a second base substrate BS2 on a side of the color filter CF away from the first base substrate BS1. The third electrode E3 is connected to a drain electrode of the second transistor TFT2. Optionally, the display panel further includes an overcoat layer OC on a side of the fourth electrode E4 away from the first base substrate BS1, and on a side of the color filter CF closer to the first base substrate BS1. Optionally, the display panel further includes a third planarization layer PLN3 on a side of the second alignment layer AL2 away from the first base substrate BS1, and on a side of the fourth electrode F4 closer to the first base substrate BS1.

In some embodiments, a respective antenna unit of the plurality of antenna units AU includes a first base substrate BS1, a first transistor TFT1 on the first base substrate BS1, a first passivation layer PVX1 on a side of the first transistor TFT1 away from the first base substrate BS1, a first electrode E1 on a side of the first passivation layer PVX1 away from the first base substrate BS1, at least one of a first planarization layer PLN1 or a second passivation layer PVX2 on a side of the first electrode E1 away from the first base substrate BS1, a first alignment layer AL1 on a side of the at least one of the first planarization layer PLN1 or the second passivation layer PVX2 away from the first base substrate BS1, a liquid crystal layer LC on a side of the first alignment layer AL1 away from the first base substrate BS1, a second alignment layer AL2 on a side of the liquid crystal layer LC away from the first base substrate BS1, a second electrode E2 on a side of the second alignment layer AL2 away from the first base substrate BS1, a first black matrix layer BM1 on a side of the second electrode E2 away from the first base substrate BS1, a ground plate GP and a radiating plate RP on a side of the first black matrix layer BM1 away from the first base substrate BS1, and a second base substrate BS2 on a side of the ground plate GP and the radiating plate RP away from the first base substrate BS1. The first electrode E1 is connected to a drain electrode of the first transistor TFT1. Optionally, the display panel further includes an overcoat layer OC on a side of the second electrode E2 away from the first base substrate BS1, and on a side of the first black matrix layer BM1 closer to the first base substrate BS1. Optionally, the display panel further includes a third planarization layer PLN3 on a side of the second alignment layer AL2 away from the first base substrate BS1, and on a side of the second electrode E2 closer to the first base substrate BS1.

In some embodiments, the fourth electrode F4 of the respective subpixel is in a same layer as the second electrode E2 of the respective antenna unit. In some embodiments, the third electrode E3 of the respective subpixel is in a layer different from the first electrode E1 of the respective antenna unit.

In some embodiments, the display panel includes a light transmissive region LTR and an antenna region AR outside of the light transmissive region LTR. In some embodiments, the display panel includes a transistor plate TP, a first conductive layer CT1 on the transistor plate TP, a first planarization layer PLN1 on a side of the first conductive layer CT1 away from the transistor plate TP, a second conductive layer CT2 on a side of the first planarization layer PLN1 away from the transistor plate TP, a liquid crystal layer LC on a side of the second conductive layer CT2 away from the transistor plate TP, a third conductive layer CT3 on a side of the liquid crystal layer LC away from the transistor plate TP, a color filter CF and a black matrix BM on a side of the third conductive layer CT3 away from the transistor plate TP, and a radiating plate RP and a ground plate GP on a side of the color filter CF and the black matrix BM away from the transistor plate TP.

In some embodiments, the third electrode E3 and the fourth electrode E4 are configured to modulate a portion of the liquid crystal layer LC in the light transmissive region LTR. The first electrode E1 and the second electrode E2 are configured to modulate a portion of the liquid crystal layer LC in the antenna region AR. In some embodiments, the first conductive layer CT1 includes the first electrode E1 in the antenna region AR. In some embodiments, the second conductive layer CT2 includes the third electrode E3 in the light transmissive region LTR. In some embodiments, the third conductive layer CT3 includes the fourth electrode E4 in the light transmissive region LTR and the second electrode E2 in the antenna region AR. The fourth electrode E4 and the second electrode E2 are in a same layer. The third electrode E3 and the first electrode E1 are in different layers.

Referring to FIG. 20, in some embodiments, an orthographic projection of the first electrode E1 on the first base substrate BS1 at least partially overlaps with an orthographic projection of the second electrode E2 on the first base substrate BS1, forming a capacitor. The inventors of the present disclosure discover that the capacitor is conducive to maintaining the state of the liquid crystal molecules in the liquid crystal layer LC. Optionally, the orthographic projection of the first electrode E1 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the second electrode E2 on the first base substrate BS1. Optionally, the orthographic projection of the second electrode E2 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the first electrode E1 on the first base substrate BS1.

Referring to FIG. 20, in some embodiments, an orthographic projection of the third electrode E3 on the first base substrate BS1 at least partially overlaps with an orthographic projection of the fourth electrode E4 on the first base substrate BS1. Optionally, the orthographic projection of the third electrode E3 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the fourth electrode F4 on the first base substrate BS1. Optionally, the orthographic projection of the fourth electrode F4 on the first base substrate BS1 substantially covers (e.g., covers at least 75% of, covers at least 80% of, covers at least 85% of, covers at least 90% of, covers at least 95% of, covers at least 99% of, or completely covers) the orthographic projection of the third electrode E3 on the first base substrate BS1.

Figure 21:
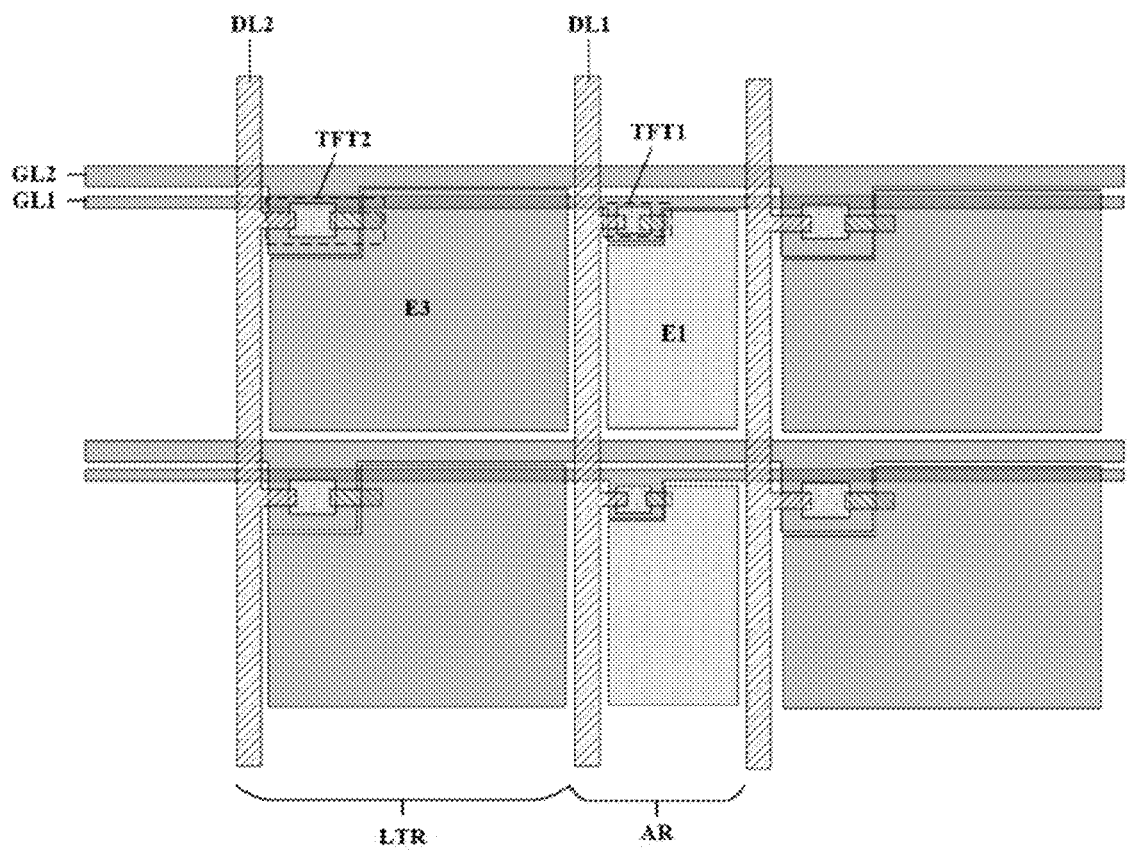
FIG. 21 is a diagram illustrating a layout of signal lines and electrodes in a display panel in some embodiments according to the present disclosure.

FIG. 21 is a diagram illustrating a layout of signal lines and electrodes in a display panel in some embodiments according to the present disclosure. Referring to FIG. 21, the display panel in some embodiments includes a plurality of first gate lines GL1, a plurality of second gate lines GL2, a plurality of first data lines DL1, and a plurality of second data lines DL2. A gate electrode of the first transistor TFT1 is connected to a respective first gate line of the plurality of first gate lines GL1. A source electrode of the first transistor TFT1 is connected to a respective first data line of the plurality of first data lines DL1. A drain electrode of the first transistor TFT1 is connected to the first electrode E1. A gate electrode of the second transistor TFT2 is connected to a respective second gate line of the plurality of second gate lines GL2. A source electrode of the second transistor TFT2 is connected to a respective second data line of the plurality of second data lines DL2. A drain electrode of the second transistor TFT2 is connected to the third electrode E3.

The respective first data line is configured to provide a respective first data signal configured to modulate a portion of the liquid crystal layer LC in the antenna region AR. The respective second data line is configured to provide a respective second data signal configured to modulate a portion of the liquid crystal layer LC in the light transmissive region LTR for displaying an image. The respective first data signal and the respective second data signal are independent from each other. Optionally, the respective first data signal and the respective second data signal are different from each other.

The first transistor TFT1 and the second transistor TFT2 are independently controlled by the respective first gate line and the respective second gate line, respectively. The respective first gate line is configured to provide a respective first gate scanning signal. The respective second gate line is configured to provide a respective second gate scanning signal. The respective first gate scanning signal and the respective second gate scanning signal are independent from each other. Optionally, the respective first gate scanning signal and the respective second gate scanning signal are different from each other.

Figure 22:
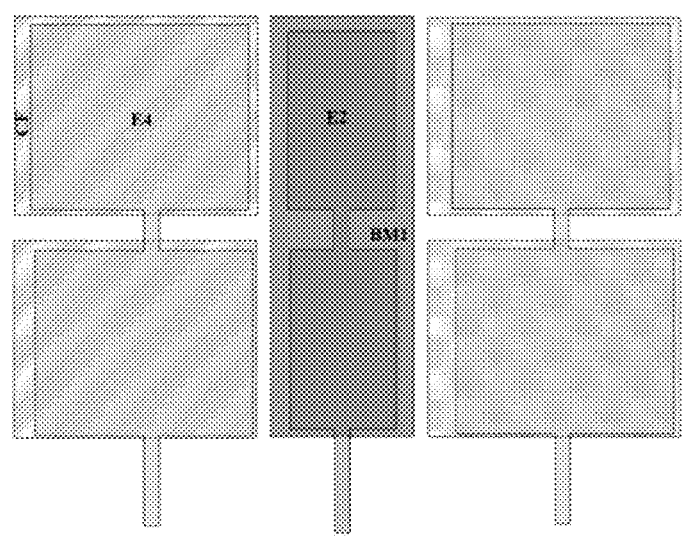
FIG. 22 is a plan view of a second electrode, a fourth electrode, a black matrix, and a color filter in a display panel in some embodiments according to the present disclosure.

FIG. 22 is a plan view of a second electrode, a fourth electrode, a black matrix, and a color filter in a display panel in some embodiments according to the present disclosure. Referring to FIG. 22, in some embodiments, an orthographic projection of the first black matrix layer BM1 on a base substrate substantially covers (e.g., covers at least 75% of, covers at least 80% of, covers at least 85% of, covers at least 90% of, covers at least 95% of, covers at least 99% of, or completely covers) an orthographic projection of the second electrode E2 on the base substrate. Optionally, the orthographic projection of the second electrode E2 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the color filter CF on the base substrate.

In some embodiments, an orthographic projection of the color filter CF on a base substrate substantially covers (e.g., covers at least 75% of, covers at least 80% of, covers at least 85% of, covers at least 90% of, covers at least 95% of, covers at least 99% of, or completely covers) an orthographic projection of the fourth electrode E4 on the base substrate. Optionally, the orthographic projection of the fourth electrode E4 on the base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the black matrix BM on the base substrate.

Figure 23:
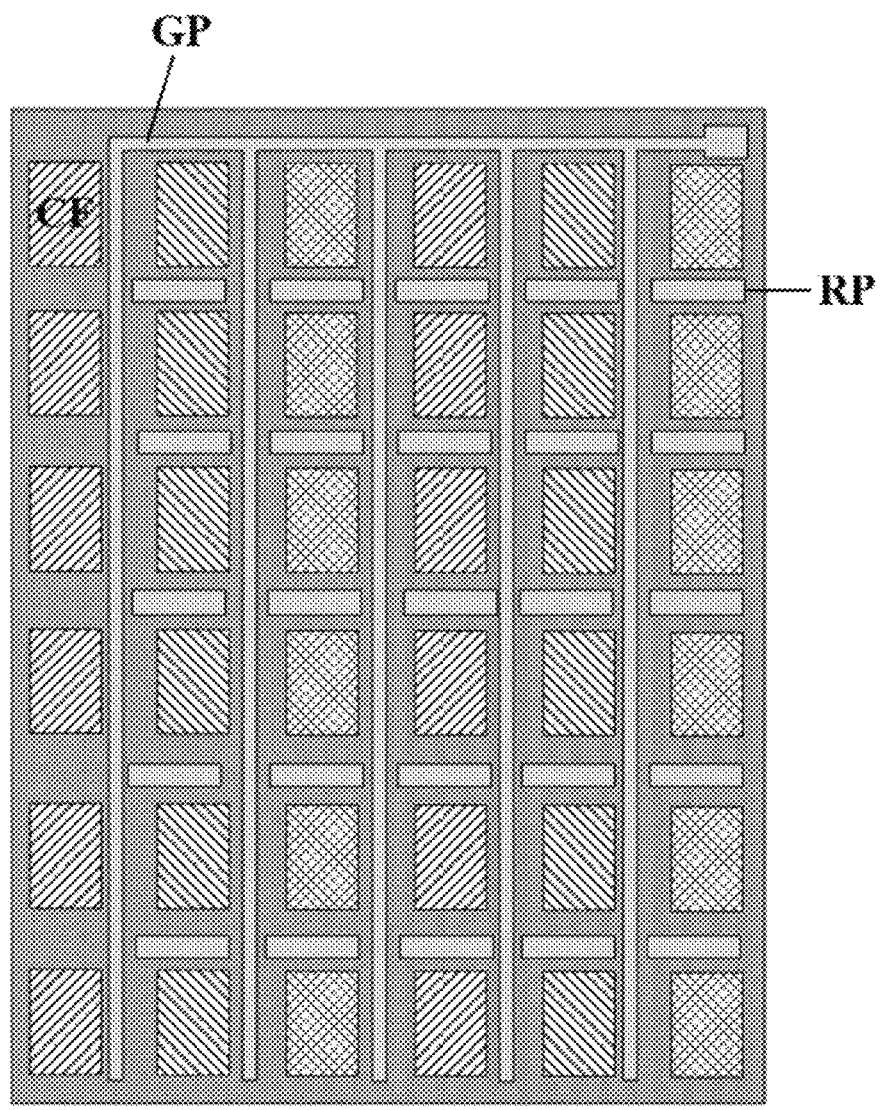
FIG. 23 is a diagram illustrating a layout of a ground plate and a radiating plate in a display panel in some embodiments according to the present disclosure.

FIG. 23 is a diagram illustrating a layout of a ground plate and a radiating plate in a display panel in some embodiments according to the present disclosure. Referring to FIG. 23, in some embodiments, the ground plate GP is in a region having the second electrode, and the radiating plate RP is in a region absent of the second electrode. In some embodiments, an orthographic projection of the ground plate GP on a base substrate at least partially overlaps with an orthographic projection of the feed line structure (including the second electrode) on the base substrate. Optionally, the orthographic projection of the ground plate GP on the base substrate substantially covers (e.g., covers at least 75% of, covers at least 80% of, covers at least 85% of, covers at least 90% of, covers at least 95% of, covers at least 99% of, or completely covers) the orthographic projection of the feed line structure on the base substrate. Optionally, the orthographic projection of the feed line structure on the base substrate substantially covers (e.g., covers at least 75% of, covers at least 80% of, covers at least 85% of, covers at least 90% of, covers at least 95% of, covers at least 99% of, or completely covers) the orthographic projection of the ground plate GP on the base substrate.

In some embodiments, an orthographic projection of the radiating plate RP on a base substrate is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the feed line structure on the base substrate.

In some embodiments, the feed line structure includes a plurality of radiating plates respectively in a plurality of antenna units. The plurality of radiating plates are arranged in a plurality of rows. A respective row of the plurality of rows of radiating plates is between two adjacent rows of color filter blocks. The respective row of the plurality of rows of radiating plates includes multiple radiating plates. A respective radiating plate of the multiple radiating plates is between two adjacent color filter blocks in a same column of color filter blocks.

In some embodiments, the ground plate GP includes a plurality of ground plate bars. A respective ground plate bar of the plurality of ground plate bars is between two adjacent columns of color filter blocks. Optionally, the plurality of ground plate bars are parts of a unitary structure. The ground plate further includes a horizontal bar connecting the plurality of ground plate bars together.

Various appropriate conductive materials may be used for making the first electrode. Examples of appropriate conductive materials for making the first electrode include low resistance, low loss metals or alloys such as copper, gold, and silver. Additional examples of appropriate conductive materials for making the first electrode include transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Various appropriate conductive materials may be used for making the second electrode. Examples of appropriate conductive materials for making the second electrode include low resistance, low loss metals or alloys such as copper, gold, and silver. Additional examples of appropriate conductive materials for making the first electrode include transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Various appropriate conductive materials may be used for making the third electrode. Examples of appropriate conductive materials for making the third electrode include various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Various appropriate conductive materials may be used for making the fourth electrode. Examples of appropriate conductive materials for making the fourth electrode include various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Various appropriate semiconductor materials may be used for making an active layer of the first transistor. Examples of appropriate semiconductor materials for making the active layer of the first transistor include polysilicon, amorphous silicon, and metal oxides such as indium gallium zinc oxide, zinc oxide, gallium oxide, indium oxide. Semiconductor materials having high mobility and stability may be achieved by doping with rare earth elements. Examples of rare earth element dopants include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y), and scandium (Sc).

In another aspect, the present invention provides a display apparatus, including the display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is a liquid crystal display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising a plurality of subpixels and a plurality of antenna units, and a ground plate and a radiating plate spaced apart from each other;
   wherein a respective antenna unit of the plurality of antenna units comprises a first base substrate, a first transistor on the first base substrate, a first electrode connected to the first transistor, and a second electrode;
   the display panel further comprises a liquid crystal layer extending through the plurality of subpixels and the plurality of antenna units;
   the first electrode and the second electrode are configured to apply an electric field across a portion of the liquid crystal layer;
   a respective subpixel of the plurality of subpixels comprises the first base substrate, a second transistor on the first base substrate, a third electrode connected to the second transistor, and a fourth electrode;
   the display panel further comprises a color filter and a black matrix;
   the color filter comprises a plurality of color filter blocks;
   an orthographic projection of a respective color filter block of the plurality of color filter blocks on the first base substrate at least partially overlaps with an orthographic projection of the third electrode on the first base substrate, and at least partially overlaps with an orthographic projection of the fourth electrode on the first base substrate; and
   an orthographic projection of the black matrix on the first base substrate at least partially overlaps with an orthographic projection of the first electrode on the first base substrate, and at least partially overlaps with an orthographic projection of the second electrode on the first base substrate;
   wherein the orthographic projection of the black matrix on the first base substrate at least partially overlaps with an orthographic projection of the ground plate on the first base substrate.

2. The display panel of claim 1, wherein the orthographic projection of the black matrix on the first base substrate substantially covers the orthographic projection of the first electrode on the first base substrate, and substantially covers the orthographic projection of the second electrode on the first base substrate.

3. The display panel of claim 1, wherein an orthographic projection of the color filter on the first base substrate is substantially non-overlapping with the orthographic projection of the first electrode on the first base substrate, and is substantially non-overlapping with the orthographic projection of the second electrode on the first base substrate; and
   the orthographic projection of the black matrix on the first base substrate is substantially non-overlapping with the orthographic projection of the third electrode on the first base substrate, and is substantially non-overlapping with the orthographic projection of the fourth electrode on the first base substrate.

4. The display panel of claim 1, wherein the orthographic projection of the black matrix on the first base substrate substantially covers the orthographic projection of the ground plate on the first base substrate.

5. The display panel of claim 1, wherein the orthographic projection of the ground plate on the first base substrate is substantially non-overlapping with the orthographic projection of the third electrode on the first base substrate, and is substantially non-overlapping with the orthographic projection of the fourth electrode on the first base substrate; and the orthographic projection of the ground plate on the first base substrate at least partially overlaps with the orthographic projection of the first electrode on the first base substrate, and at least partially overlaps with the orthographic projection of the second electrode on the first base substrate.

6. The display panel of claim 1, wherein an orthographic projection of the color filter on the first base substrate at least partially overlaps with an orthographic projection of the radiating plate on the first base substrate.

7. The display panel of claim 6, wherein the orthographic projection of the radiating plate on the first base substrate partially overlaps with a portion of the black matrix in a region where the first electrode and the second electrode are absent.

8. The display panel of claim 1, wherein the orthographic projection of the radiating plate on the first base substrate is substantially non-overlapping with the orthographic projection of the first electrode on the first base substrate, and is substantially non-overlapping with the orthographic projection of the second electrode on the first base substrate; and the orthographic projection of the radiating plate on the first base substrate at least partially overlaps with the orthographic projection of the third electrode on the first base substrate, and at least partially overlaps with the orthographic projection of the fourth electrode on the first base substrate.

9. The display panel of claim 1, wherein orthographic projection of the black matrix on the first base substrate at least partially overlaps with an orthographic projection of the radiating plate on the first base substrate.

10. The display panel of claim 1, wherein an orthographic projection of the radiating plate on the first base substrate is substantially non-overlapping with the orthographic projection of the first electrode on the first base substrate, and is substantially non-overlapping with the orthographic projection of the second electrode on the first base substrate; and the orthographic projection of the radiating plate on the first base substrate is substantially non-overlapping with the orthographic projection of the third electrode on the first base substrate, and is substantially non-overlapping with the orthographic projection of the fourth electrode on the first base substrate.

11. A display apparatus, comprising the display panel of claim 1, and one or more integrated circuits connected to the display panel.

12. A display panel, comprising a plurality of subpixels and a plurality of antenna units, a light transmissive region, and an antenna region outside of the light transmissive region;

wherein a respective antenna unit of the plurality of antenna units comprises a first base substrate, a first transistor on the first base substrate, a first electrode connected to the first transistor, and a second electrode;

the display panel further comprises a liquid crystal layer extending through the plurality of subpixels and the plurality of antenna units;

the first electrode and the second electrode are configured to apply an electric field across a portion of the liquid crystal layer;

a respective subpixel of the plurality of subpixels comprises the first base substrate, a second transistor on the first base substrate, a third electrode connected to the second transistor, and a fourth electrode;

the display panel further comprises a color filter and a black matrix;

the color filter comprises a plurality of color filter blocks;

an orthographic projection of a respective color filter block of the plurality of color filter blocks on the first base substrate at least partially overlaps with an orthographic projection of the third electrode on the first base substrate, and at least partially overlaps with an orthographic projection of the fourth electrode on the first base substrate; and an orthographic projection of the black matrix on the first base substrate at least partially overlaps with an orthographic projection of the first electrode on the first base substrate, and at least partially overlaps with an orthographic projection of the second electrode on the first base substrate;

wherein the display panel comprises a transistor plate, a first conductive layer on the transistor plate, a first planarization layer on a side of the first conductive layer away from the transistor plate, a second conductive layer on a side of the first planarization layer away from the transistor plate, the liquid crystal layer on a side of the second conductive layer away from the transistor plate, a third conductive layer on a side of the liquid crystal layer away from the transistor plate, the color filter and the black matrix on a side of the third conductive layer away from the transistor plate, and a radiating plate and a ground plate on a side of the color filter and the black matrix away from the transistor plate;

wherein the third electrode and the fourth electrode are configured to modulate a portion of the liquid crystal layer in the light transmissive region; and the first electrode and the second electrode are configured to modulate a portion of the liquid crystal layer in the antenna region.

13. The display panel of claim 12, wherein the first conductive layer comprises the fourth electrode in the light transmissive region and the first electrode in the antenna region;

the fourth electrode and the first electrode are in a same layer;

the second conductive layer comprises the third electrode in the light transmissive region and the second electrode in the antenna region; and the third electrode and the second electrode are in a same layer.

14. The display panel of claim 12, wherein the first conductive layer comprises the fourth electrode in the light transmissive region and the first electrode in the antenna region;

the fourth electrode and the first electrode are in a same layer;

the second conductive layer comprises the third electrode in the light transmissive region;

the third conductive layer comprises the second electrode in the antenna region; and the third electrode and the second electrode are in different layers.

15. The display panel of claim 12, wherein the first conductive layer comprises the first electrode in the antenna region;

the second conductive layer comprises the third electrode in the light transmissive region;

the third conductive layer comprises the fourth electrode in the light transmissive region and the second electrode in the antenna region;

the fourth electrode and the second electrode are in a same layer; and the third electrode and the first electrode are in different layers.

16. The display panel of claim 12, wherein the first conductive layer comprises the fourth electrode in the light transmissive region;

the second conductive layer comprises the third electrode in the light transmissive region, the first electrode in the antenna region, and the second electrode in the antenna region; and the third electrode, the first electrode, and the second electrode are in a same layer.

17. The display panel of claim 12, wherein the first conductive layer comprises the third electrode and the fourth electrode in the light transmissive region, and the first electrode and the second electrode in the antenna region; and the first electrode, the second electrode, the third electrode, and the fourth electrode are in a same layer.

18. The display panel of claim 12, wherein the first conductive layer comprises the first electrode in the antenna region;

the second conductive layer comprises the third electrode in the light transmissive region and the second electrode in the antenna region;

the third conductive layer comprises the fourth electrode in the light transmissive region;

the third electrode and the second electrode are in a same layer; and the fourth electrode and the first electrode are in different layers.

19. The display panel of claim 12, wherein the second conductive layer comprises the first electrode and the second electrode in the antenna region, and the third electrode in the light transmissive region;

the third conductive layer comprises the fourth electrode in the light transmissive region; and the first electrode, the second electrode, and the third electrode and are in a same layer.

* * * * *